(12) United States Patent
Wang et al.

(10) Patent No.: US 11,997,264 B2
(45) Date of Patent: May 28, 2024

(54) CHROMA DEBLOCKING HARMONIZATION FOR VIDEO CODING

(71) Applicants: Beijing Bytedance Network Technology Co., Ltd., Beijing (CN); Bytedance Inc., Los Angeles, CA (US)

(72) Inventors: Jiexi Wang, Beijing (CN); Jizheng Xu, San Diego, CA (US); Jaehong Chon, San Diego, CA (US); Weijia Zhu, San Diego, CA (US); Li Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 291 days.

(21) Appl. No.: 17/519,269

(22) Filed: Nov. 4, 2021

(65) Prior Publication Data

US 2022/0060704 A1    Feb. 24, 2022

Related U.S. Application Data

(63) Continuation of application No. PCT/CN2020/088733, filed on May 6, 2020.

(30) Foreign Application Priority Data

May 5, 2019   (WO) ................ PCT/CN2019/085511
Jun. 25, 2019  (WO) ................ PCT/CN2019/092818

(51) Int. Cl.
H04N 19/117    (2014.01)
H04N 19/176    (2014.01)
(Continued)

(52) U.S. Cl.
CPC ......... *H04N 19/117* (2014.11); *H04N 19/176* (2014.11); *H04N 19/186* (2014.11); *H04N 19/86* (2014.11)

(58) Field of Classification Search
CPC .. H04N 19/117; H04N 19/176; H04N 19/186; H04N 19/86; H04N 19/159; H04N 19/14
(Continued)

(56) References Cited

U.S. PATENT DOCUMENTS 8,712,173 B2    4/2014  Zhang et al.
9,088,797 B2    7/2015  Zhang et al.
(Continued)

FOREIGN PATENT DOCUMENTS

CN    104025590 A    9/2014
CN    104205836 A    12/2014
(Continued)

OTHER PUBLICATIONS

Kotra et al., Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0225 (Year: 2018).*
(Continued)

*Primary Examiner* — Marnie A Matt
(74) *Attorney, Agent, or Firm* — Perkins Coie LLP

(57) ABSTRACT

A method for processing video data is described and the method includes: deriving, for a conversion between a video processing unit of the video and a bitstream of the video processing unit, at least one deblocking filter associated with a chroma deblocking filter process of the video processing unit; applying a same deblocking filter from the at least one deblocking filter for all chroma components of the video processing unit; and performing the conversion based on the same deblocking filter.

20 Claims, 9 Drawing Sheets

(51) Int. Cl.
*H04N 19/186* (2014.01)
*H04N 19/86* (2014.01)
(58) Field of Classification Search
USPC .................................................. 375/240.29
See application file for complete search history.

(56) References Cited

U.S. PATENT DOCUMENTS

| | | | |
|---|---|---|---|
| 9,137,547 | B2 | 9/2015 | Van et al. |
| 9,538,200 | B2 | 1/2017 | Van et al. |
| 9,723,331 | B2 | 8/2017 | Van et al. |
| 10,321,130 | B2 | 6/2019 | Dong et al. |
| 10,582,213 | B2 | 3/2020 | Li et al. |
| 10,708,591 | B2 | 7/2020 | Zhang et al. |
| 10,708,592 | B2 | 7/2020 | Dong et al. |
| 2006/0051068 | A1 | 3/2006 | Gomila |
| 2007/0230564 | A1* | 10/2007 | Chen ............... H04N 19/61 375/E7.199 |
| 2010/0296588 | A1 | 11/2010 | Fujii et al. |
| 2012/0328029 | A1 | 12/2012 | Sadafale |
| 2013/0107973 | A1 | 5/2013 | Wang et al. |
| 2013/0259141 | A1 | 10/2013 | Van Der Auwera et al. |
| 2014/0056347 | A1 | 2/2014 | Xu et al. |
| 2014/0321552 | A1 | 10/2014 | He et al. |
| 2015/0016502 | A1 | 1/2015 | Rapaka et al. |
| 2015/0181211 | A1 | 6/2015 | He et al. |
| 2015/0237380 | A1 | 8/2015 | Sadafale |
| 2015/0358631 | A1 | 12/2015 | Zhang et al. |
| 2018/0041779 | A1* | 2/2018 | Zhang ............... H04N 19/117 |
| 2018/0270480 | A1* | 9/2018 | Zhang ............... H04N 19/154 |
| 2018/0352264 | A1 | 12/2018 | Guo et al. |
| 2019/0230353 | A1 | 7/2019 | Gadde et al. |
| 2019/0238845 | A1 | 8/2019 | Zhang et al. |
| 2020/0177910 | A1 | 6/2020 | Li et al. |
| 2020/0236353 | A1 | 7/2020 | Zhang et al. |
| 2021/0120239 | A1 | 4/2021 | Zhu et al. |
| 2021/0337239 | A1 | 10/2021 | Zhang et al. |
| 2021/0409701 | A1 | 12/2021 | Zhu et al. |
| 2022/0182622 | A1 | 6/2022 | Wang et al. |

FOREIGN PATENT DOCUMENTS

| | | |
|---|---|---|
| CN | 104584560 A | 4/2015 |
| KR | 20130083405 A | 7/2013 |
| WO | 2012064083 A2 | 5/2012 |
| WO | 2018175409 A1 | 9/2018 |

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.

Bross et al. "Versatile Video Coding (Draft 6)," Joint Video Experts Team (JVET) of ITU-T SG 16 WP 3 and ISO/IEC ITC 1/SC 29/WG 11 15th Meeting: Gothenburg, SE, Jul. 3-12, 2019, document JVET-O2001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0369, 2018.

Chen et al. "Description of Core Experiment 5 (CE5): Loop Filtering," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1025, 2019.

Ikeda et al. "CE11.1.6, CE11.1.7 and CE11.1.8: Joint Proposals for Long Deblocking from Sony, Qualcomm, Sharp, Ericsson," Joint Video Experts Team (JVET) of ITU-T SG 16 WP 3 and ISO/IEC JTC 1/SC 29/WG 11 13th Meeting: Marrakesh, MA, Jan. 9-18, 2019, document JVET-M0471, 2019.

"Information Technology—High Efficiency Coding and Media Delivery in Heterogeneous Environments—Part 2: High Efficiency Video Coding" Apr. 20, 2018, ISO/DIS 23008, 4th Edition.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting: Macao, CN, Oct. 3-12, 2018, document JVET-L0124, 2018.

Ramasubramonian et al. "AHG15: On Signalling of Chroma QP Tables," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0650, 2019.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.

Xu et al. "Non-CE5: Consistent Deblocking for Chroma Components," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0566, 2019.

Zhang et al. "CE1-6: Intra Reference Sample Deblocking," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0370, 2019.

JEM-7.0: https://jvet.hhi.fraunhofer.de/svn/svn_HMJEMSoftware/tags/ HM-16.6-JEM-7.0.

https://vcgit.hhi.fraunhofer.de/jvet/VVCSoftware_VTM/tags/VTM-4.0.

International Search Report and Written Opinion from PCT/CN2020/088733 dated Jul. 29, 2020 (11 pages).

International Search Report and Written Opinion from PCT/CN2020/113023 dated Dec. 4, 2020 (10 pages).

Non-Final Office Action from U.S. Appl. No. 17/681,054 dated Oct. 3, 2023.

* cited by examiner

Overall processing flow of deblocking filter process

Flow diagram for Bs calculation

Referred information for Bs calculation at CTU boundary

| | $p3_0$ | $p2_0$ | $p1_0$ | $p0_0$ | $q0_0$ | $q1_0$ | $q2_0$ | $q3_0$ | |
|---|---|---|---|---|---|---|---|---|---|
| | $p3_1$ | $p2_1$ | $p1_1$ | $p0_1$ | $q0_1$ | $q1_1$ | $q2_1$ | $q3_1$ | first 4 lines |
| | $p3_2$ | $p2_2$ | $p1_2$ | $p0_2$ | $q0_2$ | $q1_2$ | $q2_2$ | $q3_2$ | |
| | $p3_3$ | $p2_3$ | $p1_3$ | $p0_3$ | $q0_3$ | $q1_3$ | $q2_3$ | $q3_3$ | |
| | $p3_4$ | $p2_4$ | $p1_4$ | $p0_4$ | $q0_4$ | $q1_4$ | $q2_4$ | $q3_4$ | |
| | $p3_5$ | $p2_5$ | $p1_5$ | $p0_5$ | $q0_5$ | $q1_5$ | $q2_5$ | $q3_5$ | second 4 lines |
| | $p3_6$ | $p2_6$ | $p1_6$ | $p0_6$ | $q0_6$ | $q1_6$ | $q2_6$ | $q3_6$ | |
| | $p3_7$ | $p2_7$ | $p1_7$ | $p0_7$ | $q0_7$ | $q1_7$ | $q2_7$ | $q3_7$ | |

Pixels involved in filter on/off decision and strong/weak filter selection

*FIG. 4*

CHROMA DEBLOCKING HARMONIZATION FOR VIDEO CODING

CROSS-REFERENCE TO RELATED APPLICATION

This application is a continuation of International Patent Application No. PCT/CN2020/088733 filed on May 6, 2020 which claims the priority to and benefits of International Patent Application No. PCT/CN2019/085511, filed on May 5, 2019 and No. PCT/CN2019/092818, filed on Jun. 25, 2019. All the aforementioned patent applications are hereby incorporated by reference in their entireties.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. This method includes performing a conversion between a current video unit and a bitstream representation of the current video unit, wherein, during the conversion, a decision is made to selectively apply a same filtering operation on multiple color components of the current video unit, wherein the decision to apply the filtering operation is Binary valued based on achieving at least one condition.

In one representative aspect, the disclosed technology may be used to provide a method for video processing. This method includes deriving, for a conversion between a video processing unit of the video and a bitstream representation of the video processing unit, at least one decision result associated with decisions in a chroma deblocking filter decision process of the video processing unit; applying a same decision result from the at least one decision result for all chroma components of the video processing unit; and performing the conversion based on the same decision result.

In one representative aspect, the disclosed technology may be used to provide a method for video processing. This method includes deriving, for a conversion between a video processing unit of the video and a bitstream representation of the video processing unit, at least one deblocking filter associated with a chroma deblocking filter process of the video processing unit; applying a same deblocking filter from the at least one deblocking filter for all chroma components of the video processing unit; and performing the conversion based on the same deblocking filter.

In one representative aspect, the disclosed technology may be used to provide a method for video processing. This method includes deriving, for a conversion between a video processing unit of the video and a bitstream representation of the video processing unit, deblocking parameters associated with a chroma deblocking filter decision process and/or a chroma deblocking filter process of the video processing unit; applying same deblocking parameters from deblocking parameters for all chroma components of the video processing unit; and performing the conversion based on the same deblocking parameters.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIG. 4 shows an example of pixels involved in filter on/off decision and filter selection.

DETAILED DESCRIPTION

1. Video Coding in HEVC/H.265

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG)

was created to work on the VVC standard targeting at 50% bitrate reduction compared to HEVC.

2.1. Deblocking Scheme in HEVC

A deblocking filter process is performed for each CU in the same order as the decoding process. First, vertical edges are filtered (horizontal filtering), then horizontal edges are filtered (vertical filtering). Filtering is applied to 8×8 block boundaries which are determined to be filtered, for both luma and chroma components. 4×4 block boundaries are not processed in order to reduce the complexity.

Figure 1:
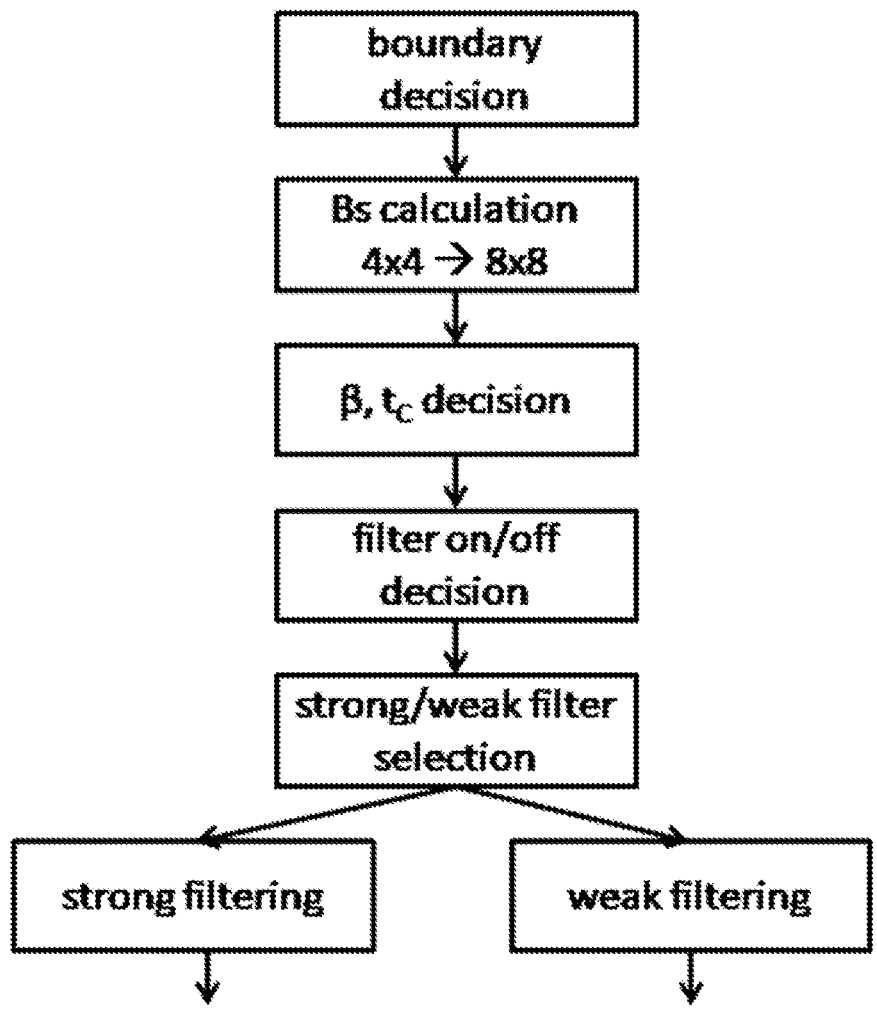
FIG. 1 shows an example of overall processing of deblocking filter process.

FIG. 1 illustrates the overall processing flow of deblocking filter process. A boundary can have three filtering status: no filtering, weak filtering and strong filtering. Each filtering decision is based on boundary strength, Bs, and threshold values, β and $t_C$.

2.1.1. Boundary Decision

Three kinds of boundaries may be involved in the filtering process: CU boundary, TU boundary and PU boundary. CU boundaries, which are outer edges of CU, are always involved in the filtering since CU boundaries are always also TU boundary or PU boundary. When PU shape is 2N×N (N>4) and RQT depth is equal to 1, TU boundary at 8×8 block grid and PU boundary between each PU inside CU are involved in the filtering. One exception is that when the PU boundary is inside the TU, the boundary is not filtered.

2.1.2. Boundary Strength Calculation

Generally speaking, boundary strength (Bs) reflects how strong filtering is needed for the boundary. If Bs is large, strong filtering should be considered.

Figure 2:
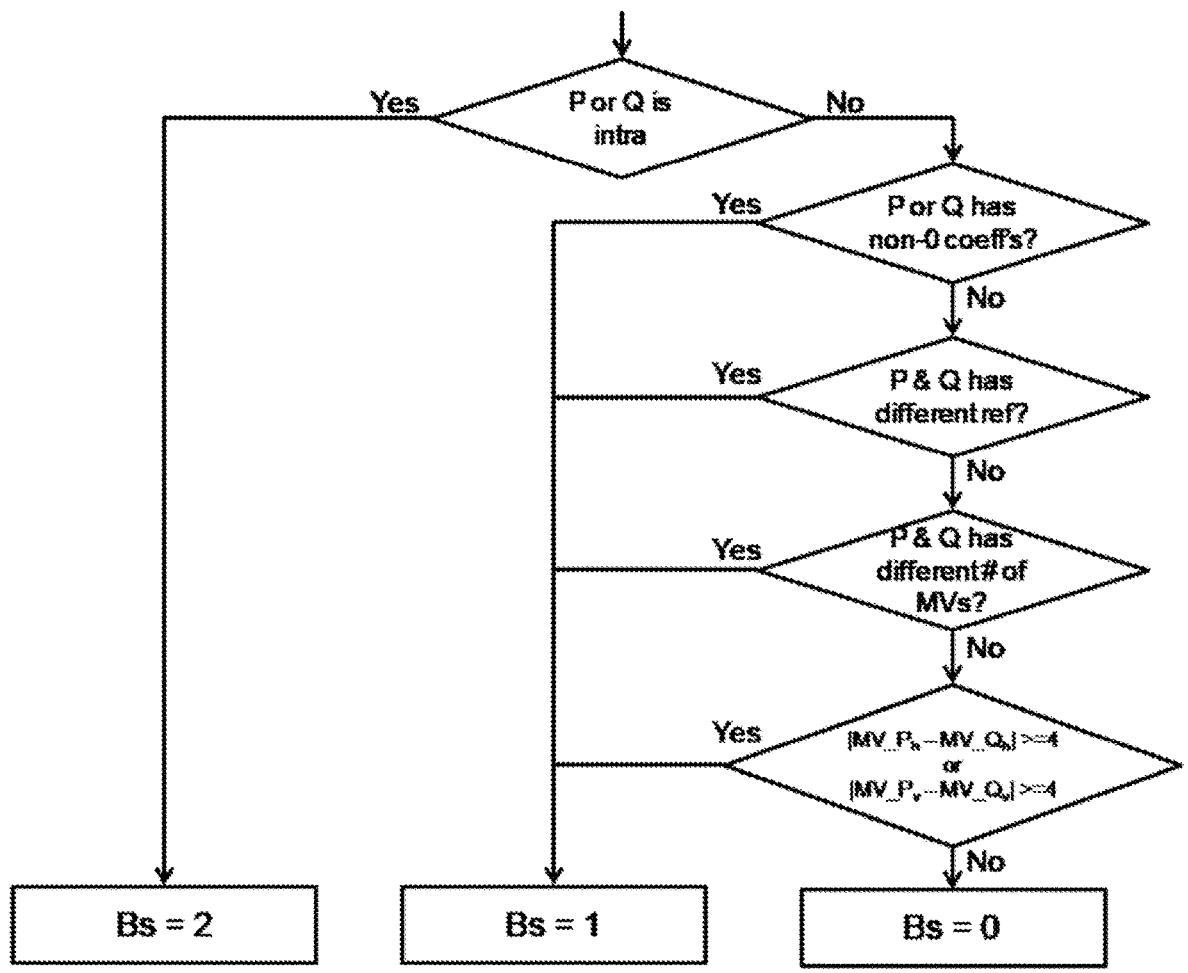
FIG. 2 shows an example of boundary strength (B S) calculation.

Let P and Q be defined as blocks which are involved in the filtering, where P represents the block located in left (vertical edge case) or above (horizontal edge case) side of the boundary and Q represents the block located in right (vertical edge case) or above (horizontal edge case) side of the boundary. FIG. 2 illustrates how the Bs value is calculated based on the intra coding mode, existence of non-zero transform coefficients and motion information, reference picture, number of motion vectors and motion vector difference.

Bs is calculated on a 4×4 block basis, but it is re-mapped to an 8×8 grid. The maximum of the two values of Bs which correspond to 8 pixels consisting of a line in the 4×4 grid is selected as the Bs for boundaries in the 8×8 grid.

Figure 3:
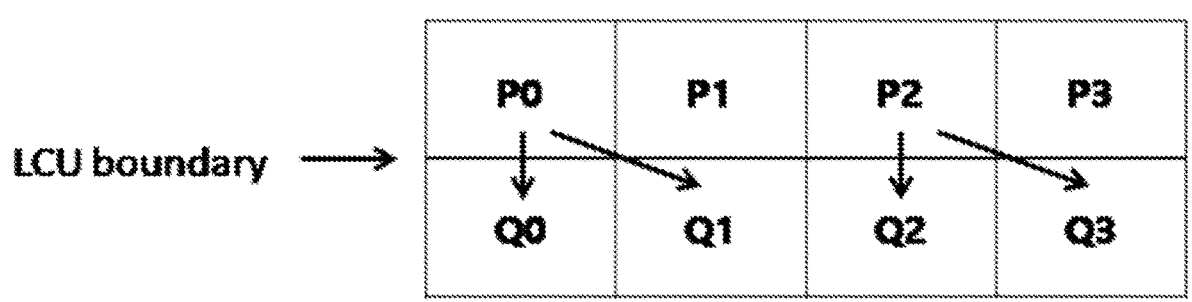
FIG. 3 shows an example of BS calculation at a boundary of a coding tree unit (CTU).

In order to reduce line buffer memory requirement, only for CTU boundary, information in every second block (4×4 grid) in left or above side is re-used as depicted in FIG. 3.

2.1.3. β and $t_C$ Decision

Threshold values β and $t_C$ which involving in filter on/off decision, strong and weak filter selection and weak filtering process are derived based on luma quantization parameter of P and Q blocks, $QP_P$ and $QP_Q$, respectively. Q used to derive β and $t_C$ is calculated as follows.

$$Q = ((QP_P + QP_Q + 1) \gg 1).$$

A variable β is derived as shown in Table 1, based on Q. If Bs is greater than 1, the variable $t_C$ is specified as Table 1 with Clip3(0, 55, Q+2) as input. Otherwise (BS is equal or less than 1), the variable $t_C$ is specified as Table 1 with Q as input.

TABLE 1

Derivation of threshold variables β and $t_C$ from input Q

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |
| Q | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 2 | 2 | 2 | 2 | 3 | 3 | 3 | 3 | 4 | 4 | 4 |
| Q | 38 | 39 | 40 | 41 | 42 | 43 | 44 | 45 | 46 | 47 | 48 | 49 | 50 | 51 | 52 | 53 | 54 | 55 | |
| β | 38 | 40 | 42 | 44 | 46 | 48 | 50 | 52 | 54 | 56 | 58 | 60 | 62 | 64 | 64 | 64 | 64 | 64 | |
| $t_C$ | 5 | 5 | 6 | 6 | 7 | 8 | 9 | 9 | 10 | 10 | 11 | 11 | 12 | 12 | 13 | 13 | 14 | 14 | |

2.1.4. Filter On/Off Decision for 4 Lines

Filter on/off decision is done for four lines as a unit. FIG. 4 illustrates the pixels involving in filter on/off decision. The 6 pixels in the two black boxes for the first four lines are used to determine filter on/off for 4 lines. The 6 pixels in two black boxes for the second 4 lines are used to determine filter on/off for the second four lines.

If dp0+dq0+dp3+dq3<0, filtering for the first four lines is turned on and strong/weak filter selection process is applied. Each variable is derived as follows.

$dp0=|p_{2,0}-2*p_{1,0}+p_{0,0}|, dp3=|p_{2,3}-2*p_{1,3}+p_{0,3}|,$
$dp4=|p_{2,4}-2*p_{1,4}+p_{0,4}|, dp7=|p_{2,7}-2*p_{1,7}+p_{0,7}|$ $dq0=|q_{2,0}-2*q_{1,0}+q_{0,0}|, dq3=|q_{2,3}-2*q_{1,3}+q_{0,3}|,$
$dq4=|q_{2,4}-2*q_{1,4}+q_{0,4}|, dq7=|q_{2,7}-2*q_{1,7}+q_{0,7}|$

If the condition is not met, no filtering is done for the first 4 lines. Additionally, if the condition is met, dE, dEp1 and dEp2 are derived for weak filtering process. The variable dE is set equal to 1. If dp0+dp3<(β+(β>>1))>>3, the variable dEp1 is set equal to 1. If dq0+dq3<(β+(β>>1))>>3, the variable dEq1 is set equal to 1.

For the second four lines, decision is made in a same fashion with above.

2.1.5. Strong/Weak Filter Selection for 4 Lines

After the first four lines are determined to filtering on in filter on/off decision, if following two conditions are met, strong filter is used for filtering of the first four lines. Otherwise, weak filter is used for filtering. Involving pixels are same with those used for filter on/off decision as depicted in FIG. 4.

$2*(dp0+dq0)<(\beta>>2), |p3_0-p0_0|+|q0_0-q3_0|<(\beta>>3)$
and $|p0_0-q0_0|<(5*t_C+1)>>1$     1)

$2*(dp3+dq3)<(\beta>>2), |p3_3-p0_3|+|q0_3-q3_3|<(\beta>>3)$
and $|p0_3-q0_3|<(5*t_C+1)>>1$     2)

As a same fashion, if following two conditions are met, strong filter is used for filtering of the second 4 lines. Otherwise, weak filter is used for filtering.

$2*(dp4+dq4)<(\beta>>2), |p3_4-p0_4|+|q0_4-q3_4|<(\beta>>3)$
and $|p0_4-q0_4|<(5*t_C+1)>>1$     1)

$2*(dp7+dq7)<(\beta>>2), |p3_7-p0_7|+|q0_7-q3_7|<(\beta>>3)$
and $|p0_7-q0_7|<(5*t_C+1)>>1$     2)

2.1.5.1. Strong Filtering

For strong filtering, filtered pixel values are obtained by following equations. It is worth to note that three pixels are modified using four pixels as an input for each P and Q block, respectively.

$p_0'=(p_2+2*p_1+2*p_0+2*q_0+q_1+4)>>3$ $q_0'=(p_1+2*p_0+2*q_0+2*q_1+q_2+4)>>3$ $p_1'=(p_2+p_1+p_0+q_0+2)>>2$ $q_1'=(p_0+q_0+q_1+q_2+2)>>2$ $p_2'=(2*p_3+3*p_2+p_1+p_0+q_0+4)>>3$ $q_2'=(p_0+q_0+q_1+3*q_2+2*q_3+4)>>3$

2.1.5.2. Weak Filtering

In some embodiments, Δ may be defined as follows.

$\Delta=(9*(q_0-p_0)-3*(q_1-p_1)+8)>>4$

When $abs(\Delta)$ is less than $t_C*10$, $\Delta=Clip3(-t_C,t_C,\Delta)$ $p_0'=Clip1_Y(p_0+\Delta)$ $q_0'=Clip1_Y(q_0-\Delta)$ If dEp1 is equal to 1, $\Delta p=Clip3(-(t_C>>1),t_C>>1,(((p_2+p_0+1)>>1)-p_1+\Delta)>>1)$ $p_1'=Clip1_Y(p_1+\Delta p)$ If dEq1 is equal to 1, $\Delta q=Clip3(-(t_C>>1),t_C>>1,(((q_2+q_0+1)>>1)-q_1-\Delta)>>1)$ $qi'=Clip1_Y(q_1+\Delta q)$ It is worth to note that maximum two pixels are modified using three pixels as an input for each P and Q block, respectively.

2.1.5.3. Chroma Filtering

Bs of chroma filtering is inherited from luma. If Bs>1 or if coded chroma coefficient existing case, chroma filtering is performed. No other filtering decision is there. And only one filter is applied for chroma. No filter selection process for chroma is used. The filtered sample values $p_0'$ and $q_0'$ are derived as follows.

$\Delta=Clip3(-t_C,t_C,((((q_0-p_0)<<2)+p_1-q_1+4)>>3))$ $p_0'=Clip1_C(p_0+\Delta)$ $q_0'=Clip1_C(q_0-\Delta)$

2.2. Deblocking Scheme in VTM-4.0

In the current VTM, i.e., VTM-4.0, the deblocking scheme is used.

2.2.1 Stronger Deblocking Filter for Luma

The proposal uses a bilinear filter when samples at either one side of a boundary belong to a large block. A sample belonging to a large block is defined as when the width>=32 for a vertical edge, and when height>=32 for a horizontal edge.

The bilinear filter is listed below.

Block boundary samples $p_i$ for i=0 to Sp−1 and $q_i$ for j=0 to Sq−1 (pi and qi follow the definitions in HEVC deblocking described above) are then replaced by linear interpolation as follows:

$p_i'=(f_i*Middle_{s,t}+(64-f_i)*P_s+32)>>6)$, clipped to $p_i \pm tcPD_i$ $q_j'=(g_j*Middle_{s,t}+(64-g_j)*Q_s+32)>>6)$, clipped to $q_j \pm tcPD_j$ where $tcPD_i$ and $tcPD_j$ term is a position dependent clipping described in Section 2.2.5 and $g_j$, $f_i$, $Middle_{s,t}$, $P_s$ and $Q_s$ are given below:

| Sp, Sq | |
|---|---|
| 7, 7 (p side: 7, q side: 7) | $f_i = 59 - i * 9$, can also be described as f = {59,50,41,32,23,14,5} <br> $g_j = 59 - j * 9$, can also be described as g = {59,50,41,32,23,14,5} <br> $Middle_{7,7} = (2 * (p_o + q_o) + p_1 + q_1 + p_2 + q_2 + p_3 + q_3 + p_4 + q_4 + p_5 + q_5 + p_6 + q_6 + 8) >> 4$ <br> $P_7 = (p_6 + p_7 + 1) >> 1$, $Q_7 = (q_6 + q_7 + 1) >> 1$ |
| 7, 3 (p side: 7 q side: 3) | $f_i = 59 - i * 9$, can also be described as f = {59,50,41,32,23,14,5} <br> $g_j = 53 - j * 21$, can also be described as g = {53,32,11} <br> $Middle_{7,3} = (2 * (p_o + q_o) + q_o + 2 * (q_1 + q_2) + p_1 + q_1 + p_2 + p_3 + p_4 + p_5 + p_6 + 8) >> 4$ <br> $P_7 = (p_6 + p_7 + 1) >> 1$, $Q_3 = (q_2 + q_3 + 1) >> 1$ |
| 3, 7 (p side: 3 q side: 7) | $g_j = 59 - j * 9$, can also be described as g = {59,50,41,32,23,14,5} <br> $f_i = 53 - i * 21$, can also be described as f = {53,32,11} <br> $Middle_{3,7} = (2 * (q_o + p_o) + p_o + 2 * (p_1 + p_2) + q_1 + p_1 + q_2 + q_3 + q_4 + q_5 + q_6 + 8) >> 4$ <br> $Q_7 = (q_6 + q_7 + 1) >> 1$, $P_3 = (p_2 + p_3 + 1) >> 1$ |
| 7, 5 (p side: 7 q side: 5) | $g_j = 58 - j * 13$, can also be described as g = {58,45,32,19,6} <br> $f_i = 59 - i * 9$, can also be described as f = {59,50,41,32,23,14,5} <br> $Middle7,5 = (2 * (p_o + q_o + p_1 + q_1) + q_2 + p_2 + q_3 + p_3 + q_4 + p_4 + q_5 + p_5 + 8) >> 4$ |

| | |
|---|---|
| 5, 7<br>(p side: 5<br>q side: 7) | $Q_5 = (q_4 + q_5 + 1) >> 1, P_7 = (p_6 + p_7 + 1) >> 1$<br>$g_j = 59 - j * 9$, can also be described as $g = \{59,50,41,32,23,14,5\}$<br>$f_i = 58 - i * 13$, can also be described as $f = \{58,45,32,19,6\}$<br>$Middle5,7 = (2 * (q_o + p_o + p_1 + q_1) + q_2 + p_2 + q_3 + p_3 + q_4 + p_4 + q_5 + p_5 + 8) >> 4$<br>$Q_7 = (q_6 + q_7 + 1) >> 1, P_5 = (p_4 + p_5 + 1) >> 1$ |
| 5, 5<br>(p side: 5<br>q side: 5) | $g_j = 58 - j * 13$, can also be described as $g = \{58,45,32,19,6\}$<br>$f_i = 58 - i * 13$, can also be described as $f = \{58,45,32,19,6\}$<br>$Middle5,5 = (2 * (q_o + p_o + p_1 + q_1 + q_2 + p_2) + q_3 + p_3 + q_4 + p_4 + 8) >> 4$<br>$Q_5 = (q_4 + q_5 + 1) >> 1, P_5 = (p_4 + p_5 + 1) >> 1$ |
| 5, 3<br>(p side: 5<br>q side: 3) | $g_j = 53 - j * 21$, can also be described as $g = \{53,32,11\}$<br>$f_i = 58 - i * 13$, can also be described as $f = \{58,45,32,19,6\}$<br>$Middle5,3 = (q_o + p_o + p_1 + q_1 + q_2 + p_2 + q_3 + p_3 + 4) >> 3$<br>$Q_3 = (q_2 + q_3 + 1) >> 1, P_5 = (p_4 + p_5 + 1) >> 1$ |
| 3, 5<br>(p side: 3<br>q side: 5) | $g_j = 58 - j * 13$, can also be described as $g = \{58,45,32,19,6\}$<br>$f_i = 53 - i * 21$, can also be described as $f = \{53,32,11\}$<br>$Middle3,5 = (q_o + p_o + p_1 + q_1 + q_2 + p_2 + q_3 + p_3 + 4) >> 3$<br>$Q_5 = (q_4 + q_5 + 1) >> 1, P_3 = (p_2 + p_3 + 1) >> 1$ |

2.2.2. Inter Prediction Methods in VVC

The deblocking decision process is described in this sub-section.

Wider-Stronger Luma Filter is Filters are Used Only if all of the Condition1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$ belongs to CU with width>=32)||(edge type is horizontal and $p_0$ belongs to CU with height>=32))?TRUE: FALSE bSideQisLargeBlk=((edge type is vertical and $q_0$ belongs to CU with width>=32)||(edge type is horizontal and $q_0$ belongs to CU with height>=32))?TRUE: FALSE Based on bSidePisLargeBlk and bSideQisLargeBlk, the condition 1 is defined as follows.

Condition1=(bSidePisLargeBlk||bSidePisLargeBlk) ?TRUE: FALSE

Next, if Condition 1 is true, the condition 2 will be further checked. First, the following variables are derived:
dp0, dp3, dq0, dq3 are first derived as in HEVC
if (p side is greater than or equal to 32)

$dp0=(dp0+Abs(p_{5,0}-2*p_{4,0}+p_{3,0})+1)>>1$ $dp3=(dp3+Abs(p_{5,3}-2*p_{4,3}+p_{3,3})+1)>>1$ if (q side is greater than or equal to 32)

$dq0=(dq0+Abs(q_{5,0}-2*q_{4,0}+q_{3,0})+1)>>1$ $dq3=(dq3+Abs(q_{5,3}-2*q_{4,3}+q_{3,3})+1)>>1$ dpq0, dpq3, dp, dq, d are then derived as in HEVC.
Then the condition 2 is defined as follows.

Condition2=$(d<\beta)$?TRUE: FALSE

Where d=dp0+dq0+dp3+dq3, as shown in section 2.1.4.
If Condition1 and Condition2 are valid it is checked if any of the blocks uses sub-blocks:
If(mode block P==SUBBLOCKMODE)
  Sp=5
else
  Sp=7
else
  Sp=3
If(bSideQisLargeBlk)
  If(mode block Q==SUBBLOCKMODE)
    Sq=5
  else
    Sq=7
else
  Sq=3

Finally, if both the Condition 1 and Condition 2 are valid, the proposed deblocking method will check the condition 3 (the large block Strong filter condition), which is defined as follows.

In the Condition3 StrongFilterCondition, the following variables are derived:
dpq is derived as in HEVC.
$sp_3=Abs(p_3-p_0)$, derived as in HEVC
if (p side is greater than or equal to 32)
  if(Sp==5)
    $sp_3=(sp_3+Abs(p_5-p_3)+1)>>1$
  else
    $sp_3=(sp_3+Abs(p_7-p_3)+1)>>1$
$sq_3=Abs(q_0-q_3)$, derived as in HEVC
if (q side is greater than or equal to 32)
  If(Sq==5)
    $sq_3=(sq_3+Abs(q_5-q_3)+1)>>1$
  else
    $sq_3=(sq_3+Abs(q_7-q_3)+1)>>1$ As in HEVC derive, StrongFilterCondition=(dpq is less than $(\beta>>2)$, $sp_3+sq_3$ is less than $(3*\beta>>5)$, and $Abs(p_0-q_0)$ is less than $(5*t_C+1)>>1)$?TRUE: FALSE

2.2.3. Strong Deblocking Filter for Chroma

The following strong deblocking filter for chroma is defined:

$p_2'=(3*p_3+2*p_2+p_1+p_0+q_0+4)>>3$ $p_1'=(2*p_3+p_2+2*p_1+p_0+q_0+q_1+4)>>3$ $p_0'=(p_3+p_2+p_1+2*p_0+q_0+q_1+q_2+4)>>3$

The proposed chroma filter performs deblocking on a 4×4 chroma sample grid.

2.2.4. Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one are basically the same as for HEVC luma deblocking decision, which are on/off decision and strong filter decision, respectively.

In the first decision, boundary strength (bS) is modified for chroma filtering as shown in Table 1. The conditions in Table 2 are checked sequentially. If a condition is satisfied, then the remaining conditions with lower priorities are skipped.

TABLE 2

Modified boundary strength in JVET-M0471

| Priority | Conditions | Y | U | V |
|---|---|---|---|---|
| 5 | At least one of the adjacent blocks is intra | 2 | 2 | 2 |
| 4 | At least one of the adjacent blocks has non-zero transform coefficients | 1 | 1 | 1 |
| 3 | Absolute difference between the motion vectors that belong to the adjacent blocks is greater than or equal to one integer luma sample | 1 | N/A | N/A |
| 2 | Motion prediction in the adjacent blocks refers to vectors is different | 1 | N/A | N/A |
| 1 | Otherwise | 0 | 0 | 0 |

Chroma deblocking is performed when bS is equal to 2, or bS is equal to 1 when a large block boundary is detected.

The second and third condition is basically the same as HEVC luma strong filter decision as follows.

In the second condition:
d is then derived as in HEVC luma deblocking.
The second condition will be TRUE when d is less than β.

In the third condition StrongFilterCondition is derived as follows:
dpq is derived as in HEVC.

$sp_3 = \text{Abs}(p_3 - p_0)$, derived as in HEVC $sq_3 = \text{Abs}(q_0 - q_3)$, derived as in HEVC As in HEVC derive, StrongFilterCondition=(dpq is less than (β>>2), $sp_3 + sq_3$ is less than (β>>3), and $\text{Abs}(p_0 - q_0)$ is less than $(5*t_C + 1) >> 1$)

2.2.5. Position Dependent Clipping

The proposal also introduces a position dependent clipping tcPD which is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with proposed asymmetrical filter, depending on the result of decision making process described in Section 2.2, position dependent threshold table is selected from Tc7 and Tc3 tables that are provided to decoder as a side information:

$Tc7 = \{6,5,4,3,2,1,1\}$;

$Tc3 = \{6,4,2\}$;

$tcPD = (SP==3)?Tc3:Tc7$;

$tcQD = (SQ==3)?Tc3:Tc7$;

For the P or Q boundaries being filtered with a short symmetrical filter, position dependent threshold of lower magnitude is applied:

$Tc3 = \{3,2,1\}$;

Following defining the threshold, filtered $p'_i$ and $q'_i$ sample values are clipped according to tcP and tcQ clipping values:

$p''_i = \text{clip3}(p'_i + tcP_i, p'_i - tcP_i, p'_i)$;

$q''_j = \text{clip3}(q'_j + tcQ_j, q'_j - tcQ_j, q'_j)$;

where $p'_i$ and $q'_i$ are filtered sample values, $p''_i$ and $q''_j$ are output sample value after the clipping and $tcP_i$ $tcP_i$ are clipping thresholds that are derived from the VVC tc parameter and tcPD and tcQD. Term clip3 is a clipping function as it is specified in VVC.

2.2.6. Sub-Block Deblocking Adjustment

To enable parallel friendly deblocking using both long filters and sub-block deblocking the long filters is restricted to modify at most 5 samples on a side that uses sub-block deblocking (AFFINE or ATMVP) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.

```
If(mode block Q==SUBBLOCKMODE && edge!=0){
    if (!(implicitTU && (edge==(64/4))))
        if (edge==2||edge==(orthogonalLength-2)||edge==
            (56/4)||edge==(72/4))
            Sp=Sq=2;
        else
            Sp=Sq=3;
    else
        Sp=Sq=bSideQisLargeBlk ? 5:3
}
```

Where edge equal to 0 corresponds to CU boundary, edge equal to 2 or equal to orthogonalLength−2 corresponds to sub-block boundary 8 samples from a CU boundary etc. Where implicit TU is true if implicit split of TU is used.

2.2.7. Restriction to 4CTU/2CTU Line Buffers for Luma/Chroma

Filtering of horizontal boundary is limiting Sp=3 for luma, Sp=1 and Sq=1 for chroma, when the horizontal boundary is aligned with the CTU boundary.

2.3 Specification of Deblocking in VVC Draft 5

8.8.3. Deblocking Filter Process

8.8.3.1. General

Inputs to this process are the reconstructed picture prior to deblocking, i.e., the array recPictureL and, when ChromaArrayType is not equal to 0, the arrays recPictureCb and recPictureCr.

Outputs of this process are the modified reconstructed picture after deblocking, i.e., the array recPictureL and, when ChromaArrayType is not equal to 0, the arrays recPictureCb and recPictureCr. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE—Although the filtering process is specified on a picture basis in this Specification, the filtering process can be implemented on a coding unit basis with an equivalent result, provided the decoder properly accounts for the processing dependency order so as to produce the same output values. The deblocking filter process is applied to all coding subblock edges and transform block edges of a picture, except the following types of edges:

Edges that are at the boundary of the picture,
    Edges that coincide with the virtual boundaries of the picture when pps_loop_filter_across_virtual_boundaries_disabled_flag is equal to 1,
    Edges that coincide with brick boundaries when loop_filter_across_bricks_enabled_flag is equal to 0,
    Edges that coincide with slice boundaries when loop_filter_across_slices_enabled_flag is equal to 0,
    Edges that coincide with upper or left boundaries of slices with slice_deblocking_filter_disabled_flag equal to 1,
    Edges within slices with slice_deblocking_filter_disabled_flag equal to 1,
    Edges that do not correspond to 8×8 sample grid boundaries of the considered component,
    Edges within the luma component for which both sides of the edge have intra_bdpcm_flag equal to 1,
    Edges of chroma subblocks that are not edges of the associated transform unit.

The edge type, vertical or horizontal, is represented by the variable edgeType as specified in Table 8-19.

TABLE 8-19

| Name of association to edgeType | |
|---|---|
| edge Type | Name of edgeType |
| 0 (vertical edge) | EDGE_VER |
| 1 (horizontal edge) | EDGE_HOR |

When slice_deblocking_filter_disabled_flag of the current slice is equal to 0, the following applies:

The variable treeType is derived as follows:
If slice type is equal to I and qtbtt_dual_tree_intra_flag is equal to 1, treeType is set equal to DUAL_TREE_LUMA.
Otherwise, treeType is set equal to SINGLE_TREE.
The vertical edges are filtered by invoking the deblocking filter process for one direction as specified in clause 8.8.3.2 with the variable treeType, the reconstructed picture prior to deblocking, i.e., the array recPictureL and, when ChromaArrayType is not equal to 0 and treeType is equal to SINGLE_TREE, the arrays recPictureCb and recPictureCr, and the variable edgeType set equal to EDGE_VER as inputs, and the modified reconstructed picture after deblocking, i.e., the array recPictureL and, when ChromaArrayType is not equal to 0 and treeType is equal to SINGLE_TREE, the arrays recPictureCb and recPictureCr as outputs.
The horizontal edge are filtered by invoking the deblocking filter process for one direction as specified in clause 8.8.3.2 with the variable treeType, the modified reconstructed picture after deblocking, i.e., the array recPictureL and, when ChromaArrayType is not equal to 0 and treeType is equal to SINGLE_TREE, the arrays recPictureCb and recPictureCr, and the variable edgeType set equal to EDGE_HOR as inputs, and the modified reconstructed picture after deblocking, i.e., the array recPictureL and, when ChromaArrayType is not equal to 0 and treeType is equal to SINGLE_TREE, the arrays recPictureCb and recPictureCr as outputs.
When slice type is equal to I and qtbtt_dual_tree_intra_flag is equal to 1, the following applies:
The variable treeType is set equal to DUAL_TREE_CHROMA
The vertical edges are filtered by invoking the deblocking filter process for one direction as specified in clause 8.8.3.2 with the variable treeType, the reconstructed picture prior to deblocking, i.e., the arrays recPictureCb and recPictureCr, and the variable edgeType set equal to EDGE_VER as inputs, and the modified reconstructed picture after deblocking, i.e., the arrays recPictureCb and recPictureCr as outputs.
The horizontal edge are filtered by invoking the deblocking filter process for one direction as specified in clause 8.8.3.2 with the variable treeType, the modified reconstructed picture after deblocking, i.e., the arrays recPictureCb and recPictureCr, and the variable edgeType set equal to EDGE_HOR as inputs, and the modified reconstructed picture after deblocking, i.e., the arrays recPictureCb and recPictureCr as outputs.

8.8.3.2. Deblocking Filter Process for One Direction

Inputs to this process are:
    the variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed,
    when treeType is equal to SINGLE_TREE or DUAL_TREE_LUMA, the reconstructed picture prior to deblocking, i.e., the array recPictureL,
    when ChromaArrayType is not equal to 0 and treeType is equal to SINGLE_TREE or DUAL_TREE_CHROMA, the arrays recPictureCb and recPictureCr, a variable edgeType specifying whether a vertical (EDGE_VER) or a horizontal (EDGE_HOR) edge is filtered.

Outputs of this process are the modified reconstructed picture after deblocking, i.e.:
when treeType is equal to SINGLE_TREE or DUAL_TREE_LUMA, the array recPictureL,
when ChromaArrayType is not equal to 0 and treeType is equal to SINGLE_TREE or DUAL_TREE_CHROMA, the arrays recPictureCb and recPictureCr.

The variables firstCompIdx and lastCompIdx are derived as follows:

firstCompIdx=
(treeType==DUAL_TREE_CHROMA)?1:0 (8-1004)

lastCompIdx=(treeType==DUAL_TREE_LUMA
ChromaArrayType==0)?0:2 (8-1005)

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when edgeType is equal to EDGE_VER and xCb %8 is equal 0 or when edgeType is equal to EDGE_HOR and yCb %8 is equal to 0, the edges are filtered by the following ordered steps:
1. The variable filterEdgeFlag is derived as follows:
If edgeType is equal to EDGE_VER and one or more of the following conditions are true, filterEdgeFlag is set equal to 0:
The left boundary of the current coding block is the left boundary of the picture.
The left boundary of the current coding block is the left boundary of the brick and loop_filter_across_bricks_enabled_flag is equal to 0.
The left boundary of the current coding block is the left boundary of the slice and loop_filter_across_slices_enabled_flag is equal to 0.
The left boundary of the current coding block is one of the vertical virtual boundaries of the picture and pps_loop_filter_across_virtual_boundaries_disabled_flag is equal to 1.
Otherwise if edgeType is equal to EDGE_HOR and one or more of the following conditions are true, the variable filterEdgeFlag is set equal to 0:
The top boundary of the current luma coding block is the top boundary of the picture.
The top boundary of the current coding block is the top boundary of the brick and loop_filter_across_bricks_enabled_flag is equal to 0.
The top boundary of the current coding block is the top boundary of the slice and loop_filter_across_slices_enabled_flag is equal to 0.
The top boundary of the current coding block is one of the horizontal virtual boundaries of the picture and pps_loop_filter_across_virtual_boundaries_disabled_flag is equal to 1.
Otherwise, filterEdgeFlag is set equal to 1.
2. All elements of the two-dimensional (nCbW)×(nCbH) array edgeFlags, maxFilterLengthQs and maxFilterlengthPs are initialized to be equal to zero.
3. The derivation process of transform block boundary specified in clause 8.8.3.3 is invoked with the location (xCb, yCb), the coding block width nCbW, the coding block height nCbH, the variable cIdx, the variable filterEdgeFlag, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.
4. When cIdx is equal to 0, the derivation process of coding subblock boundary specified in clause 8.8.3.4 is invoked with the location (xCb, yCb), the coding block width nCbW, the coding block height nCbH, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.
5. The picture sample array recPicture is derived as follows:
If cIdx is equal to 0, recPicture is set equal to the reconstructed luma picture sample array prior to deblocking recPictureL.
Otherwise, if cIdx is equal to 1, recPicture is set equal to the reconstructed chroma picture sample array prior to deblocking recPictureCb.
Otherwise (cIdx is equal to 2), recPicture is set equal to the reconstructed chroma picture sample array prior to deblocking recPictureCr.
6. The derivation process of the boundary filtering strength specified in clause 8.8.3.5 is invoked with the picture sample array recPicture, the luma location (xCb, yCb), the coding block width nCbW, the coding block height nCbH, the variable edgeType, the variable cIdx, and the array edgeFlags as inputs, and an (nCbW)×(nCbH) array bS as output.
7. The edge filtering process for one direction is invoked for a coding block as specified in clause 8.8.3.6 with the variable edgeType, the variable cIdx, the reconstructed picture prior to deblocking recPicture, the location (xCb, yCb), the coding block width nCbW, the coding block height nCbH, and the arrays bS, maxFilterLengthPs, and maxFilterLengthQs, as inputs, and the modified reconstructed picture recPicture as output.

8.8.3.3. Derivation Process of Transform Block Boundary

Inputs to this process are:
a location (xCb, yCb) specifying the top-left sample of the current coding block relative to the top-left sample of the current picture,
a variable nCbW specifying the width of the current coding block,
a variable nCbH specifying the height of the current coding block,
a variable cIdx specifying the colour component of the current coding block,
a variable filterEdgeFlag,
a two-dimensional (nCbW)×(nCbH) array edgeFlags,
two-dimensional (nCbW)×(nCbH) arrays maxFilterLengthQs and maxFilterLengthPs,
a variable edgeType specifying whether a vertical (EDGE_VER) or a horizontal (EDGE_HOR) edge is filtered.
Outputs of this process are:
the modified two-dimensional (nCbW)×(nCbH) array edgeFlags,
the modified two-dimensional (nCbW)×(nCbH) arrays maxFilterLengthQs, maxFilterLengthPs.
Depending on edgeType, the arrays edgeFlags, maxFilterLengthPs and maxFilterLengthQs are derived as follows:
If edgeType is equal to EDGE_VER, the following applies:

The variable numEdges is set equal to Max(1, nCbW/8).

For xEdge=0 . . . numEdges−1 and y=0 . . . nCbH−1, the following applies:
  The horizontal position x inside the current coding block is set equal to xEdge*8.
  The value of edgeFlags[x][y] is derived as follows:
    If pps_loop_filter_across_virtual_boundaries_disabled_flag equal to 1 and (xCb+x) is equal to PpsVirtualBoundariesPosX[n] for any n=0 . . . pps_num_ver_virtual_boundaries−1, edgeFlags[x][y] is set equal to 0.
    Otherwise, if x is equal to 0, edgeFlags[x][y] is set equal to filterEdgeFlag.
    Otherwise, if the location (xCb+x, yCb+y) is at a transform block edge, edgeFlags[x][y] is set equal to 1.
  When edgeFlags[x][y] is equal to 1, the following applies:
    If cIdx is equal to 0, the following applies:
      The value of maxFilterLengthQs[x][y] is derived as follows:
        If the width in luma samples of the transform block at luma location (xCb+x, yCb+y) is equal to or greater than 32, maxFilterLengthQs[x][y] is set equal to 7.
        Otherwise, maxFilterLengthQs[x][y] is set equal to 3.
      The value of maxFilterLengthPs[x][y] is derived as follows:
        If the width in luma samples of the transform block at luma location (xCb+x1, yCb+y) is equal to or greater than 32, maxFilterLengthPs[x][y] is set equal to 7.
        Otherwise, maxFilterLengthPs[x][y] is set equal to 3.
    Otherwise (cIdx is not equal to 0), the values of maxFilterLengthPs[x][y] and maxFilterLengthQs[x][y] are derived as follows:
      If the width in chroma samples of the transform block at chroma location (xCb+x, yCb+y) and the width at chroma location (xCb+x1, yCb+y) are both equal to or greater than 8, maxFilterLengthPs[x][y] and maxFilterLengthQs[x][y] are set equal to 3.
      Otherwise, maxFilterLengthPs[x][y] and maxFilterLengthQs[x][y] are set equal to 1.

Otherwise (edgeType is equal to EDGE_HOR), the following applies:
The variable numEdges is set equal to Max(1, nCbH/8).
For yEdge=0 . . . numEdges−1 and x=0 . . . nCbW−1, the following applies:
  The vertical position y inside the current coding block is set equal to yEdge*8.
  The value of edgeFlags[x][y] is derived as follows:
    If pps_loop_filter_across_virtual_boundaries_disabled_flag equal to 1 and (yCb+y) is equal to PpsVirtualBoundariesPosY[n] for any n=0 . . . pps_num_hor_virtual_boundaries−1, edgeFlags[x][y] is set equal to 0.
    Otherwise, if y is equal to 0, edgeFlags[x][y] is set equal to filterEdgeFlag.
    Otherwise, if the location (xCb+x, yCb+y) is at a transform block edge, edgeFlags[x][y] is set equal to 1.
  When edgeFlags[x][y] is equal to 1, the following applies:
    If cIdx is equal to 0, the following applies:
      The value of maxFilterLengthQs[x][y] is derived as follows:
        If the height in luma samples of the transform block at luma location (xCb+x, yCb+y) is equal to or greater than 32, maxFilterLengthQs[x][y] is set equal to 7.
        Otherwise, maxFilterLengthQs[x][y] is set equal to 3.
      The value of maxFilterLengthPs[x][y] is derived as follows:
        If the height in luma samples of the transform block at luma location (xCb+x, yCb+y−1) is equal to or greater than 32, maxFilterLengthPs[x][y] is set equal to 7.
        Otherwise, maxFilterLengthPs[x][y] is set equal to 3.
    Otherwise (cIdx is not equal to 0), the values of maxFilterLengthPs[x][y] and maxFilterLengthQs[x][y] are derived as follows:
      If all of the following conditions are true, maxFilterLengthPs[x][y] and maxFilterLengthQs[x][y] are set equal to 3:
        The height in chroma samples of the transform block at chroma location (xCb+x, yCb+y) and the height at chroma location (xCb+x, yCb+y−1) are both equal to or greater than 8.
        (yCb+y) % CtbHeightC is greater than 0, i.e. the horizontal edge do not overlap with the upper chroma CTB boundary.
      Otherwise, maxFilterLengthPs[x] [y] and maxFilterLengthQs[x][y] are set equal to 1.

8.8.3.4. Derivation Process of Coding Subblock Boundary

Inputs to this process are:
  a location (xCb, yCb) specifying the top-left sample of the current coding block relative to the top-left sample of the current picture,
  a variable nCbW specifying the width of the current coding block,
  a variable nCbH specifying the height of the current coding block,
  a two-dimensional (nCbW)×(nCbH) array edgeFlags,
  two-dimensional (nCbW)×(nCbH) arrays maxFilterLengthQs and maxFilterLengthPs,
  a variable edgeType specifying whether a vertical (EDGE_VER) or a horizontal (EDGE_HOR) edge is filtered.
Outputs of this process are:
  the modified two-dimensional (nCbW)×(nCbH) array edgeFlags,
  the modified two-dimensional (nCbW)×(nCbH) arrays maxFilterLengthQs and maxFilterLengthPs.
The number of coding subblock in horizontal direction numSbX and in vertical direction numSbY are derived as follows:
  If inter affine flag[xCb][yCb] is equal to 1 or merge subblock flag[xCb][yCb] is equal to 1, numSbX and numSbY are set equal to NumSbX[xCb][yCb] and NumSbY[xCb][yCb], respectively.
  Otherwise, numSbX and numSbY are both set equal to 1.
Depending on the value of edgeType the following applies:
  If edgeType is equal to EDGE_VER, the following applies:

The variable sbW is set equal to Max(8, nCbW/numSbX).
The array edgeTbFlags is set equal to edgeFlags.
For xEdge=0 . . . min((nCbW/8)−1, numSbX−1), y=0 . . . nCbH−1:
　The horizontal position x inside the current coding block is set equal to)(Edge*sbW.
　The value of edgeFlags[x][y] is derived as follows:
　　If pps_loop_filter_across_virtual_boundaries_disabled_flag is equal to 1 and x is equal to PpsVirtualBoundariesPosX[n] for any n=0 . . . pps_num_ver_virtual_boundaries−1, the following applies:

edgeFlags[x][y]=0　　(8-1006)

Otherwise, the following applies:

edgeFlags[x][y]=1　　(8-1007)

When edgeFlags[x][y] is equal to 1, the values of maxFilterLengthPs[x][y] and maxFilterLengthQs[x][y] are modified as follows:
　　　If x is equal to 0, the following applies:
　　　　When numSbX is greater than 1, the following applies:

maxFilterLengthQs[x][y]=Min(5,maxFilterLengthQs[x][y])　　(8-1008)

When inter affine flag[xCb−1][yCb] is equal to 1 or merge subblock flag[xCb−1][yCb] is equal to 1, the following applies:

maxFilterLengthPs[x][y]=Min(5,maxFilterLengthPs[x][y])　　(8-1009)

Otherwise, if edgeTbFlags[x][y] is equal to 1, the following applies:

maxFilterLengthPs[x][y]=Min(5,maxFilterLengthPs[x][y])　　(8-1010)

maxFilterLengthQs[x][y]=Min(5,maxFilterLengthQs[x][y])　　(8-1011)

Otherwise, if one or more of the following conditions are true:
　　　　xEdge is equal to 1,
　　　　xEdge is equal to (nCbW/8)−1,
　　　　edgeTbFlags[x−sbW][y] is equal to 1,
　　　　edgeTbFlags[x+sbW][y] is equal to 1,
　　　the following applies:

maxFilterLengthPs[x][y]=2　　(8-1012)

maxFilterLengthQs[x][y]=2　　(8-1013)

Otherwise, the following applies:

maxFilterLengthPs[x][y]=3　　(8-1014)

maxFilterLengthQs[x][y]=3　　(8-1015)

Otherwise if edgeType is equal to EDGE_HOR, the following applies:
The variable sbH is set equal to Max(8, nCbH/numSbY).
The array edgeTbFlags is set equal to edgeFlags.
For yEdge=0 . . . min((nCbH/8)−1, numSbY−1), x=0 . . . nCbW−1:
　The vertical position y inside the current coding block is set equal to yEdge*sbH.
　The value of edgeFlags[x][y] is derived as follows:
　　If pps_loop_filter_across_virtual_boundaries_disabled_flag is equal to 1 and y is equal to PpsVirtualBoundariesPosY[n] for any n=0 . . . pps_num_hor_virtual_boundaries−1, the following applies:

edgeFlags[x][y]=0　　(8-1016)

Otherwise, the following applies:

edgeFlags[x][y]=1　　(8-1017)

When edgeFlags[x][y] is equal to 1, the values of maxFilterLengthPs[x][y] and maxFilterLengthQs[x][y] are modified as follows:
　　　If y is equal to 0 and edgeFlags[x][y] is equal to 1, the following applies:
　　　　When numSbY is greater than 1, the following applies:

maxFilterLengthQs[x][y]=Min(5,maxFilterLengthQs[x][y])　　(8-1018)

When inter affine flag[xCb][yCb−1] is equal to 1 or merge subblock flag[xCb][yCb−1] is equal to 1, the following applies:

maxFilterLengthPs[x][y]=Min(5,maxFilterLengthPs[x][y])　　(8-1019)

Otherwise, if edgeTbFlags[x][y] is equal to 1, the following applies:

maxFilterLengthPs[x][y]=Min(5,maxFilterLengthPs[x][y])　　(8-1020)

maxFilterLengthQs[x][y]=Min(5,maxFilterLengthQs[x][y])　　(8-1021)

Otherwise, if one or more of the following conditions are true:
　　　　yEdge is equal to 1,
　　　　yEdge is equal to (nCbH/8)−1,
　　　　edgeTbFlags[x][y−sbH] is equal to 1,
　　　　edgeTbFlags[x][y+sbH] is equal to 1,
　　　the following applies:

maxFilterLengthPs[x][y]=2　　(8-1022)

maxFilterLengthQs[x][y]=2　　(8-1023)

Otherwise, the following applies:

maxFilterLengthPs[x][y]=3　　(8-1024)

maxFilterLengthQs[x][y]=3　　(8-1025)

8.8.3.5. Derivation Process of Boundary Filtering Strength

Inputs to this process are:
　a picture sample array recPicture,
　a location (xCb, yCb) specifying the top-left sample of the current coding block relative to the top-left sample of the current picture,
　a variable nCbW specifying the width of the current coding block,
　a variable nCbH specifying the height of the current coding block,
　a variable edgeType specifying whether a vertical (EDGE_VER) or a horizontal (EDGE_HOR) edge is filtered,
　a variable cIdx specifying the colour component of the current coding block,
　a two-dimensional (nCbW)×(nCbH) array edgeFlags.
Output of this process is a two-dimensional (nCbW)×(nCbH) array bS specifying the boundary filtering strength.

The variables xDi, yDj, xN and yN are derived as follows:
If edgeType is equal to EDGE_VER, xDi=(i<<3)  (8-1026)

yDj=cIdx==0?(j<<2):(j<<1)  (8-1027)

xN is set equal to Max(0,(nCbW/8)−1)  (8-1028)

yN=cIdx==0?(nCbH/4)−1:(nCbH/2)−1  (8-1029)

Otherwise (edgeType is equal to EDGE_HOR), xDi=cIdx==0?(i<<2):(i<<1)  (8-1030)

yDj=(j<<3)  (8-1031)

xN=cIdx==0?(nCbW/4)−1:(nCbW/2)−1  (8-1032)

yN=Max(0,(nCbH/8)−1)  (8-1033)

For xDi with i=0 . . . xN and yDj with j=0 . . . yN, the following applies:
  If edgeFlags[xDi][yDj] is equal to 0, the variable bS[xDi][yDj] is set equal to 0.
  Otherwise, the following applies:
    The sample values p0 and q0 are derived as follows:
      If edgeType is equal to EDGE_VER, p0 is set equal to recPicture[xCb+xDi−1][yCb+yDj] and q0 is set equal to recPicture[xCb+xDi][yCb+yDj].
      Otherwise (edgeType is equal to EDGE_HOR), p0 is set equal to recPicture[xCb+xDi][yCb+yDj−1] and q0 is set equal to recPicture[xCb+xDi][yCb+yDj].
    The variable bS[xDi][yDj] is derived as follows:
      If cIdx is equal to 0 and both samples p0 and q0 are in a coding block with intra_bdpcm_flag equal to 1, bS[xDi][yDj] is set equal to 0.
      Otherwise, if the sample p0 or q0 is in the coding block of a coding unit coded with intra prediction mode, bS[xDi][yDj] is set equal to 2.
      Otherwise, if the block edge is also a transform block edge and the sample p0 or q0 is in a coding block with ciip_flag equal to 1, bS[xDi][yDj] is set equal to 2.
      Otherwise, if the block edge is also a transform block edge and the sample p0 or q0 is in a transform block which contains one or more non-zero transform coefficient levels, bS[xDi][yDj] is set equal to 1.
      Otherwise, if the prediction mode of the coding subblock containing the sample p0 is different from the prediction mode of the coding subblock containing the sample q0, bS[xDi][yDj] is set equal to 1.
      Otherwise, if cIdx is equal to 0 and one or more of the following conditions are true, bS[xDi][yDj] is set equal to 1:
        The coding subblock containing the sample p0 and the coding subblock containing the sample q0 are both coded in IBC prediction mode, and the absolute difference between the horizontal or vertical component of the motion vectors used in the prediction of the two coding subblocks is greater than or equal to 4 in units of quarter luma samples.
        For the prediction of the coding subblock containing the sample p0 different reference pictures or a different number of motion vectors are used than for the prediction of the coding subblock containing the sample q0.
          NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.
          NOTE 2—The number of motion vectors that are used for the prediction of a coding subblock with top-left sample covering (xSb, ySb), is equal to PredFlagL0[xSb][ySb]+PredFlagL1[xSb][ySb].
      One motion vector is used to predict the coding subblock containing the sample p0 and one motion vector is used to predict the coding subblock containing the sample q0, and the absolute difference between the horizontal or vertical component of the motion vectors used is greater than or equal to 4 in units of quarter luma samples.
      Two motion vectors and two different reference pictures are used to predict the coding subblock containing the sample p0, two motion vectors for the same two reference pictures are used to predict the coding subblock containing the sample q0 and the absolute difference between the horizontal or vertical component of the two motion vectors used in the prediction of the two coding subblocks for the same reference picture is greater than or equal to 4 in units of quarter luma samples.
      Two motion vectors for the same reference picture are used to predict the coding subblock containing the sample p0, two motion vectors for the same reference picture are used to predict the coding subblock containing the sample q0 and both of the following conditions are true:
        The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.
        The absolute difference between the horizontal or vertical component of list 0 motion vector used in the prediction of the coding subblock containing the sample p0 and the list 1 motion vector used in the prediction of the coding subblock containing the sample q0 is greater than or equal to 4 in units of quarter luma samples, or the absolute difference between the horizontal or vertical component of the list 1 motion vector used in the prediction of the coding subblock containing the sample p0 and list 0 motion vector used in the prediction of the coding subblock containing the sample q0 is greater than or equal to 4 in units of quarter luma samples.
      Otherwise, the variable bS[xDi][yDj] is set equal to 0.

8.8.3.6. Edge Filtering Process for One Direction

Inputs to this process are:
  a variable edgeType specifying whether vertical edges (EDGE_VER) or horizontal edges (EDGE_HOR) are currently processed, a variable cIdx specifying the current colour component,
the reconstructed picture prior to deblocking recPicture,
a location (xCb, yCb) specifying the top-left sample of the current coding block relative to the top-left sample of the current picture,
a variable nCbW specifying the width of the current coding block,
a variable nCbH specifying the height of the current coding block,
the array bS specifying the boundary strength,
the arrays maxFilterLengthPs and maxFilterLengthQs.

Output of this process is the modified reconstructed picture after deblocking recPicture.

For the edge filtering process, the following applies:
The variables subW, subH, xN, yN, xDk and yDm are derived as follows:

$$subW = cIdx == 0\,?\,1 : SubWidthC \qquad (8\text{-}1034)$$

$$subH = cIdx == 0\,?\,1 : SubHeightC \qquad (8\text{-}1035)$$

$$xN = edgeType == EDGE\_VER\,?\,Max(0, (nCbW/8) - 1) : (nCbW/4/subW) - 1 \qquad (8\text{-}1036)$$

$$yN = edgeType == EDGE\_VER\,?\,(nCbH/4/subH) - 1 : Max(0, (nCbH/8) - 1) \qquad (8\text{-}1037)$$

$$xDk = edgeType == EDGE\_VER\,?\,(k<<3) : (k<<(2/subW)) \qquad (8\text{-}1038)$$

$$yDm = edgeType == EDGE\_VER\,?\,(m<<(2/subH)) : (m<<3) \qquad (8\text{-}1039)$$

For xDk with k=0 ... xN and yDm with m=0 ... yN, the following applies:
When bS[xDk][yDm] is greater than 0, the following ordered steps apply:
If cIdx is equal to 0, the filtering process for edges in the luma coding block of the current coding unit consists of the following ordered steps:
1. The decision process for luma block edges as specified in clause 8.8.3.6.1 is invoked with the luma picture sample array recPicture, the location of the luma coding block (xCb, yCb), the luma location of the block (xBl, yBl) set equal to (xDk, yDm), the edge direction edgeType, the boundary filtering strength bS[xDk][yDm], the maximum filter lengths maxFilterLengthP set equal to maxFilterLengthPs[xDk][yDm] and maxFilterLengthQ set equal to maxFilterLengthQs[xDk][yDm] as inputs, and the decisions dE, dEp and dEq, the modified maximum filter lengths maxFilterLengthP and maxFilterLengthQ, and the variable tC as outputs.
2. The filtering process for block edges as specified in clause 8.8.3.6.2 is invoked with the luma picture sample array recPicture, the location of the luma coding block (xCb, yCb), the luma location of the block (xBl, yBl) set equal to (xDk, yDm), the edge direction edgeType, the decisions dE, dEp and dEq, the maximum filter lengths maxFilterLengthP and maxFilterLengthQ, and the variable tC as inputs, and the modified luma picture sample array recPicture as output.
Otherwise (cIdx is not equal to 0), the filtering process for edges in the chroma coding block of current coding unit specified by cIdx consists of the following ordered steps:

1. The variable cQpPicOffset is derived as follows:

$$cQpPicOffset = cIdx == 1\,?\,pps\_cb\_qp\_offset : pps\_cr\_qp\_offset \qquad (8\text{-}1040)$$

2. The decision process for chroma block edges as specified in clause 8.8.3.6.3 is invoked the chroma picture sample array recPicture, the location of the chroma coding block (xCb, yCb), the location of the chroma block (xBl, yBl) set equal to (xDk, yDm), the edge direction edgeType, the variable cQpPicOffset, the boundary filtering strength bS[xDk][yDm], and the variable maxFilterLengthCbCr set equal to maxFilterLengthPs[xDk][yDm] as inputs, the modified variable maxFilterLengthCbCr, and the variable tC as outputs.
3. When maxFilterLengthCbCr is greater than 0, the filtering process for chroma block edges as specified in clause 8.8.3.6.4 is invoked with the chroma picture sample array recPicture, the location of the chroma coding block (xCb, yCb), the chroma location of the block (xBl, yBl) set equal to (xDk, yDm), the edge direction edgeType, the variable maxFilterLengthCbCr, and the variable tC as inputs, and the modified chroma picture sample array recPicture as output.

8.8.3.6.1. Decision Process for Luma Block Edges

Inputs to this process are:
a picture sample array recPicture,
a location (xCb, yCb) specifying the top-left sample of the current coding block relative to the top-left sample of the current picture,
a location (xBl, yBl) specifying the top-left sample of the current block relative to the top-left sample of the current coding block,
a variable edgeType specifying whether a vertical (EDGE_VER) or a horizontal (EDGE_HOR) edge is filtered,
a variable bS specifying the boundary filtering strength,
a variable maxFilterLengthP specifying the max filter length,
a variable maxFilterLengthQ specifying the max filter length.

Outputs of this process are:
the variables dE, dEp and dEq containing decisions,
the modified filter length variables maxFilterLengthP and maxFilterLengthQ,
the variable tC.

The sample values $p_{i,k}$ and $q_{j,k}$ with i=0 ... maxFilterLengthP, j=0 ... maxFilterLengthQ and k=0 and 3 are derived as follows:
If edgeType is equal to EDGE_VER, the following applies:

$$q_{j,k} = recPictureL[xCb + xBl + j][yCb + yBl + k] \qquad (8\text{-}1041)$$

$$p_{i,k} = recPictureL[xCb + xBl - i - 1][yCb + yBl + k] \qquad (8\text{-}1042)$$

Otherwise (edgeType is equal to EDGE_HOR), the following applies:

$$q_{j,k} = recPicture[xCb + xBl + k][yCb + yBl + j] \qquad (8\text{-}1043)$$

$$p_{i,k} = recPicture[xCb + xBl + k][yCb + yBl - i - 1] \qquad (8\text{-}1044)$$

The variable qpOffset is derived as follows:
If sps_ladf_enabled_flag is equal to 1, the following applies:

The variable lumaLevel of the reconstructed luma level is derived as follow:

$$lumaLevel = ((p0,0+p0,3+q0,0+q0,3) >> 2), \quad (8\text{-}1045)$$

The variable qpOffset is set equal to sps_ladf_lowest_interval_qp_offset and modified as follows:

for(i=0; i<sps_num_ladf_intervals_minus2+1; i++){
  if(lumaLevel>SpsLadfIntervalLowerBound[i+1])
    qpOffset=sps_ladf_qp_offset[i] (8-1046)
  else
    break
}

Otherwise, qpOffset is set equal to 0.

The variables QpQ and QpP are set equal to the QpY values of the coding units which include the coding blocks containing the sample q0,0 and p0,0, respectively.

The variable qP is derived as follows:

$$qP = ((QpQ + QpP + 1) >> 1) + qpOffset \quad (8\text{-}1047)$$

The value of the variable β' is determined as specified in Table 8 20 based on the quantization parameter Q derived as follows:

$$Q = \text{Clip3}(0, 63, qP + (slice\_beta\_offset\_div2 << 1)) \quad (8\text{-}1048)$$

where slice_beta_offset_div2 is the value of the syntax element slice_beta_offset_div2 for the slice that contains sample q0,0.

The variable β is derived as follows:

$$\beta = \beta' * (1 << (BitDepthY - 8)) \quad (8\text{-}1049)$$

The value of the variable tC' is determined as specified in Table 8 20 based on the quantization parameter Q derived as follows:

$$Q = \text{Clip3}(0, 65, qP + 2*(bS-1) + (slice\_tc\_offset\_div2 << 1)) \quad (8\text{-}1050)$$

where slice_tc_offset_div2 is the value of the syntax element slice_tc_offset_div2 for the slice that contains sample q0,0.

The variable tC is derived as follows:

$$tC = tC' * (1 << (BitDepthY - 8)) \quad (8\text{-}1051)$$

The following ordered steps apply:

1. The variables dp0, dp3, dq0 and dq3 are derived as follows:

$$dp0 = \text{Abs}(p2,0 - 2*p1,0 + p0,0) \quad (8\text{-}1052)$$

$$dp3 = \text{Abs}(p2,3 - 2*p1,3 + p0,3) \quad (8\text{-}1053)$$

$$dq0 = \text{Abs}(q2,0 - 2*q1,0 + q0,0) \quad (8\text{-}1054)$$

$$dq3 = \text{Abs}(q2,3 - 2*q1,3 + q0,3) \quad (8\text{-}1055)$$

2. When maxFilterLengthP and maxFilterLengthQ both are equal to or greater than 3 the variables sp0, sq0, spq0, sp3, sq3 and spq3 are derived as follows:

$$sp0 = \text{Abs}(p3,0 - p0,0) \quad (8\text{-}1056)$$

$$sq0 = \text{Abs}(q0,0 - q3,0) \quad (8\text{-}1057)$$

$$spq0 = \text{Abs}(p0,0 - q0,0) \quad (8\text{-}1058)$$

$$sp3 = \text{Abs}(p3,3 - p0,3) \quad (8\text{-}1059)$$

$$sq3 = \text{Abs}(q0,3 - q3,3) \quad (8\text{-}1060)$$

$$spq3 = \text{Abs}(p0,3 - q0,3) \quad (8\text{-}1061)$$

3. The variables sidePisLargeBlk and sideQisLargeBlk are set equal to 0.

4. When maxFilterLengthP is larger than 3, sidePisLargeBlk is set equal to 1:

5. When maxFilterLengthQ is larger than 3, sideQisLargeBlk is set equal to 1:

6. When edgeType is equal to EDGE_HOR and (yCb+yBl) % CtbSizeY is equal to 0, sidePisLargeBlk is set equal to 0.

7. The variables dSam0 and dSam3 are initialized to 0.

8. When sidePisLargeBlk or sideQisLargeBlk is greater than 0, the following applies:

a. The variables dp0L, dp3L are derived and maxFilterLengthP is modified as follows:
    If sidePisLargeBlk is equal to 1, the following applies:

$$dp0L = (dp0 + \text{Abs}(p5,0 - 2*p4,0 + p3,0) + 1) >> 1 \quad (8\text{-}1062)$$

$$dp3L = (dp3 + \text{Abs}(p5,3 - 2*p4,3 + p3,3) + 1) >> 1 \quad (8\text{-}1063)$$

Otherwise, the following applies:

$$dp0L = dp0 \quad (8\text{-}1064)$$

$$dp3L = dp3 \quad (8\text{-}1065)$$

$$maxFilterLengthP = 3 \quad (8\text{-}1066)$$

b. The variables dq0L and dq3L are derived as follows:
    If sideQisLargeBlk is equal to 1, the following applies:

$$dq0L = (dq0 + \text{Abs}(q5,0 - 2*q4,0 + q3,0) + 1) >> 1 \quad (8\text{-}1067)$$

$$dq3L = (dq3 + \text{Abs}(q5,3 - 2*q4,3 + q3,3) + 1) >> 1 \quad (8\text{-}1068)$$

Otherwise, the following applies:

$$dq0L = dq0 \quad (8\text{-}1069)$$

$$dq3L = dq3 \quad (8\text{-}1070)$$

c. The variables dpq0L, dpq3L, and dL are derived as follows:

$$dpq0L = dp0L + dq0L \quad (8\text{-}1071)$$

$$dpq3L = dp3L + dq3L \quad (8\text{-}1072)$$

$$dL = dpq0L + dpq3L \quad (8\text{-}1073)$$

d. When dL is less than β, the following ordered steps apply:
    i. The variable dpq is set equal to 2*dpq0L.
    ii. The variable sp is set equal to sp0, the variable sq is set equal to sq0 and the variable spq is set equal to spq0.
    iii. The variables p0 p3 qo and q3 are first initialized to 0 and then modified according to sidePisLargeBlk and sideQisLargeBlk as follows:
      When sidePisLargeBlk is equal to 1, the following applies:

$$p3 = p3,0 \quad (8\text{-}1074)$$

$$p0 = p\text{maxFilterLengthP},0 \quad (8\text{-}1075)$$

When sideQisLargeBlk is equal to 1, the following applies:

$$q3 = q3,0 \quad (8\text{-}1076)$$

$$q0 = q\text{maxFilterLengthQ},0 \quad (8\text{-}1077)$$

iv. For the sample location (xCb+xBl, yCb+yBl), the decision process for a luma sample as specified in clause 8.8.3.6.5 is invoked with the sample values p0, p3, q0, q3, the variables dpq, sp, sq, spq, sidePisLargeBlk, sideQisLargeBlk, 0 and tC as inputs, and the output is assigned to the decision dSam0.

v. The variable dpq is set equal to 2*dpq3L.
vi. The variable sp is set equal to sp3, the variable sq is set equal to sq3 and the variable spq is set equal to spq3.
vii. The variables p0 p3 q0 and q3 are first initialized to 0 and are then modified according to sidePisLargeBlk and sideQisLargeBlk as follows:
When sidePisLargeBlk is equal to 1, the following applies:

$$p3=p3,3 \quad (8\text{-}1078)$$

$$p0=pmaxFilterLengthP,3 \quad (8\text{-}1079)$$

When sideQisLargeBlk is equal to 1, the following applies:

$$q3=q3,3 \quad (8\text{-}1080)$$

$$q0=qmaxFilterLengthQ,3 \quad (8\text{-}1081)$$

viii. When edgeType is equal to EDGE_VER for the sample location (xCb+xBl, yCb+yBl+3) or when edgeType is equal to EDGE_HOR for the sample location (xCb+xBl+3, yCb+yBl), the decision process for a luma sample as specified in clause 8.8.3.6.5 is invoked with the sample values p0, p3, q0, q3, the variables dpq, sp, sq, spq, sidePisLargeBlk, sideQisLargeBlk, β and tC as inputs, and the output is assigned to the decision dSam3.

9. The variables dE, dEp and dEq are derived as follows:
If dSam0 and dSam3 are both equal to 1, the variable dE is set equal to 3, dEp is set equal to 1, and dEq is set equal to 1.

Otherwise, the following ordered steps apply:
a. The variables dpq0, dpq3, dp, dq and d are derived as follows:

$$dpq0=dp0+dq0 \quad (8\text{-}1082)$$

$$dpq3=dp3+dq3 \quad (8\text{-}1083)$$

$$dp=dp0+dp3 \quad (8\text{-}1084)$$

$$dq=dq0+dq3 \quad (8\text{-}1085)$$

$$d=dpq0+dpq3 \quad (8\text{-}1086)$$

b. The variables dE, dEp, dEq, sidePisLargeBlk and sideQisLargeBlk are set equal to 0.
c. When d is less than 0 and both maxFilterLengthP and maxFilterLengthQ are greater than 2, the following ordered steps apply:

i. The variable dpq is set equal to 2*dpq0.
ii. The variable sp is set equal to sp0, the variable sq is set equal to sq0 and the variable spq is set equal to spq0.
iii. For the sample location (xCb+xBl, yCb+yBl), the decision process for a luma sample as specified in clause 8.8.3.6.5 is invoked with the variables p0, p3, q0, q3 all set equal to 0, the variables dpq, sp, sq, spq, sidePisLargeBlk, sideQisLargeBlk, β and tC as inputs, and the output is assigned to the decision dSam0.
iv. The variable dpq is set equal to 2*dpq3.
v. The variable sp is set equal to sp3, the variable sq is set equal to sq3 and the variable spq is set equal to spq3.
vi. When edgeType is equal to EDGE_VER for the sample location (xCb+xBl, yCb+yBl+3) or when edgeType is equal to EDGE_HOR for the sample location (xCb+xBl+3, yCb+yBl), the decision process for a sample as specified in clause 8.8.3.6.5 is invoked with the variables p0, p3, q0, q3 all set equal to 0, the variables dpq, sp, sq, spq, sidePisLargeBlk, sideQisLargeBlk, β and tC as inputs, and the output is assigned to the decision dSam3.

d. When d is less than β, the following ordered steps apply:
i. The variable dE is set equal to 1.
ii. When dSam0 is equal to 1 and dSam3 is equal to 1, the variable dE is set equal to 2.
iii. When dp is less than $(β+(β>>1))>>3$, the variable dEp is set equal to 1.
iv. When dq is less than $(β+(β>>1))>>3$, the variable dEq is set equal to 1.

TABLE 8

| 20-Derivation of threshold variables β' and tC' from input Q | | | | | | | | | | | | | | | | | |
|---|---|---|---|---|---|---|---|---|---|---|---|---|---|---|---|---|---|
| Q | 0 | 1 | 2 | 3 | 4 | 5 | 6 | 7 | 8 | 9 | 10 | 11 | 12 | 13 | 14 | 15 | 16 |
| β' | 0 | 0 | 0 | 0 | 0 | 0 | 0 | 0 | 0 | 0 | 0 | 0 | 0 | 0 | 0 | 0 | 6 |
| $t_C'$ | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| β' | 7 | 8 | 9 | 10 | 11 | 12 | 13 | 14 | 15 | 16 | 17 | 18 | 20 | 22 | 24 | 26 | 28 |
| $t_C'$ | 0 | 1 | 1 | 1 | 1 | 1 | 1 | 1 | 1 | 1 | 2 | 2 | 2 | 2 | 3 | 3 | 3 |
| Q | 34 | 35 | 36 | 37 | 38 | 39 | 40 | 41 | 42 | 43 | 44 | 45 | 46 | 47 | 48 | 49 | 50 |
| β' | 30 | 32 | 34 | 36 | 38 | 40 | 42 | 44 | 46 | 48 | 50 | 52 | 54 | 56 | 58 | 60 | 62 |
| $t_C'$ | 3 | 4 | 4 | 4 | 5 | 5 | 6 | 6 | 7 | 8 | 9 | 10 | 11 | 13 | 14 | 16 | 18 |
| Q | 51 | 52 | 53 | 54 | 55 | 56 | 57 | 58 | 59 | 60 | 61 | 62 | 63 | 64 | 65 | | |
| β' | 64 | 66 | 68 | 70 | 72 | 74 | 76 | 78 | 80 | 82 | 84 | 86 | 88 | — | — | | |
| $t_C'$ | 20 | 22 | 25 | 28 | 31 | 35 | 39 | 44 | 50 | 56 | 63 | 70 | 79 | 88 | 99 | | |

8.8.3.6.2. Filtering Process for Luma Block Edges

Inputs to this process are:
a picture sample array recPicture,
a location (xCb, yCb) specifying the top-left sample of the current coding block relative to the top-left sample of the current picture,
a location (xBl, yBl) specifying the top-left sample of the current block relative to the top-left sample of the current coding block,
a variable edgeType specifying whether a vertical (EDGE_VER) or a horizontal (EDGE_HOR) edge is filtered,
the variables dE, dEp and dEq containing decisions,
the variables maxFilterLengthP and maxFilterLengthQ containing max filter lengths,
the variable tC.
Output of this process is the modified picture sample array recPicture.

Depending on the value of edgeType, the following applies:
If edgeType is equal to EDGE_VER, the following ordered steps apply:
1. The sample values pi,k and qi,k with i=0 . . . maxFilterLengthP, j=0 . . . maxFilterLengthQ and k=0 . . . 3 are derived as follows:

$$qj,k = recPictureL[xCb+xBl+j][yCb+yBl+k] \quad (8\text{-}1087)$$

$$pi,k = recPictureL[xCb+xBl-i-1][yCb+yBl+k] \quad (8\text{-}1088)$$

2. When dE is not equal to 0 and dE is not equal to 3, for each sample location (xCb+xBl, yCb+yBl+k), k=0 . . . 3, the following ordered steps apply:
   a. The filtering process for a luma sample using short filters as specified in clause 8.8.3.6.6 is invoked with the sample values pi,k, qi,k with i=0 . . . 3, the locations (xPi, yPi) set equal to (xCb+xBl−i−1, yCb+yBl+k) and (xQi, yQi) set equal to (xCb+xBl+yCb+yBl+k) with i=0 . . . 2, the decision dE, the variables dEp and dEq and the variable tC as inputs, and the number of filtered samples nDp and nDq from each side of the block boundary and the filtered sample values pi' and qj' as outputs.
   b. When nDp is greater than 0, the filtered sample values pi' with i=0 . . . nDp−1 replace the corresponding samples inside the sample array recPicture as follows:

$$recPicture[xCb+xBl-i-1][yCb+yBl+k] = pi' \quad (8\text{-}1089)$$

c. When nDq is greater than 0, the filtered sample values qj' with j=0 . . . nDq−1 replace the corresponding samples inside the sample array recPicture as follows:

$$recPicture[xCb+xBl+j][yCb+yBl+k] = qj' \quad (8\text{-}1090)$$

3. When dE is equal to 3, for each sample location (xCb+xBl, yCb+yBl+k), k=0 . . . 3, the following ordered steps apply:
   a. The filtering process for a luma sample using long filters as specified in clause 8.8.3.6.7 is invoked with the sample values pi,k, qj,k with i=0 . . . maxFilterLengthP and j=0 . . . maxFilterLengthQ, the locations (xPi, yPi) set equal to (xCb+xBl−i−1, yCb+yBl+k) with i=0 . . . maxFilterLengthP−1 and (xQj, yQj) set equal to (xCb+xBl+j, yCb+yBl+k) with j=0 . . . maxFilterLengthQ−1, the variables maxFilterLengthP, maxFilterLengthQ and tC as inputs and the filtered samples values pi' and qj' as outputs.
   b. The filtered sample values pi' with i=0 . . . maxFilterLengthP−1 replace the corresponding samples inside the sample array recPicture as follows:

$$recPicture[xCb+xBl-i-1][yCb+yBl+k] = pi' \quad (8\text{-}1091)$$

c. The filtered sample values qj' with j=0 . . . maxFilterLengthQ−1 replace the corresponding samples inside the sample array recPicture as follows:

$$recPicture[xCb+xBl+j][yCb+yBl+k] = qj' \quad (8\text{-}1092)$$

Otherwise (edgeType is equal to EDGE_HOR), the following ordered steps apply:
1. The sample values pi,k and qi,k with i=0 . . . maxFilterLengthP, j=0 . . . maxFilterLengthQ and k=0 . . . 3 are derived as follows:

$$qj,k = recPictureL[xCb+xBl+k][yCb+yBl+j] \quad (8\text{-}1093)$$

$$pi,k = recPictureL[xCb+xBl+k][yCb+yBl-i-1] \quad (8\text{-}1094)$$

2. When dE is not equal to 0 and dE is not equal to 3, for each sample location (xCb+xBl+k, yCb+yBl), k=0 . . . 3, the following ordered steps apply:
   a. The filtering process for a luma sample using short filters as specified in clause 8.8.3.6.6 is invoked with the sample values pi,k, qi,k with i=0 . . . 3, the locations (xPi, yPi) set equal to (xCb+xBl+k, yCb+yBl−i−1) and (xQi, yQi) set equal to (xCb+xBl+k, yCb+yBl+i) with i=0 . . . 2, the decision dE, the variables dEp and dEq, and the variable tC as inputs, and the number of filtered samples nDp and nDq from each side of the block boundary and the filtered sample values pi' and qj' as outputs.
   b. When nDp is greater than 0, the filtered sample values pi' with i=0 . . . nDp−1 replace the corresponding samples inside the sample array recPicture as follows:

$$recPicture[xCb+xBl+k][yCb+yBl-i-1] = pi' \quad (8\text{-}1095)$$

c. When nDq is greater than 0, the filtered sample values qj' with j=0 . . . nDq−1 replace the corresponding samples inside the sample array recPicture as follows:

$$recPicture[xCb+xBl+k][yCb+yBl+j] = qj' \quad (8\text{-}1096)$$

3. When dE is equal to 3, for each sample location (xCb+xBl+k, yCb+yBl), k=0 . . . 3, the following ordered steps apply:
   a. The filtering process for a luma sample using long filters as specified in clause 8.8.3.6.7 is invoked with the sample values pi,k, qj,k with i=0 . . . maxFilterLengthP and j=0 . . . maxFilterLengthQ, the locations (xPi, yPi) set equal to (xCb+xBl+k, yCb+yBl−i−1) with i=0 . . . maxFilterLengthP−1 and (xQj, yQj) set equal to (xCb+xBl+k, yCb+yBl+j) with j=0 . . . maxFilterLengthQ−1, the variables maxFilterLengthP, maxFilterLengthQ, and the variable tC as inputs, and the filtered sample values pi' and qj' as outputs.
   b. The filtered sample values pi' with i=0 . . . maxFilterLengthP−1 replace the corresponding samples inside the sample array recPicture as follows:

$$recPicture[xCb+xBl+k][yCb+yBl-i-1] = pi' \quad (8\text{-}1097)$$

c. The filtered sample values qj' with j=0 . . . maxFilterLengthQ−1 replace the corresponding samples inside the sample array recPicture as follows:

$$recPicture[xCb+xBl+k][yCb+yBl+j] = qj' \quad (8\text{-}1098)$$

8.8.3.6.3. Decision Process for Chroma Block Edges

This process is only invoked when ChromaArrayType is not equal to 0.
Inputs to this process are:
  a chroma picture sample array recPicture,
  a chroma location (xCb, yCb) specifying the top-left sample of the current chroma coding block relative to the top-left chroma sample of the current picture, a chroma location (xBl, yBl) specifying the top-left sample of the current chroma block relative to the top-left sample of the current chroma coding block,
a variable edgeType specifying whether a vertical (EDGE_VER) or a horizontal (EDGE_HOR) edge is filtered,
a variable cQpPicOffset specifying the picture-level chroma quantization parameter offset,
a variable bS specifying the boundary filtering strength,
a variable maxFilterLengthCbCr.

Outputs of this process are
the modified variable maxFilterLengthCbCr,
the variable tC.

The values pi and qi with i=0 . . . maxFilterLengthCbCr and k=0 . . . 1 are derived as follows:
If edgeType is equal to EDGE_VER, the following applies::

$$q_{i,k} = recPicture[xCb+xBl+i][yCb+yBl+k] \quad (8\text{-}1099)$$

$$p_{i,k} = recPicture[xCb+xBl-i-1][yCb+yBl+k] \quad (8\text{-}1100)$$

Otherwise (edgeType is equal to EDGE_HOR), the following applies:

$$q_{i,k} = recPicture[xCb+xBl+k][yCb+yBl+i] \quad (8\text{-}1101)$$

$$p_{i,k} = recPicture[xCb+xBl+k][yCb+yBl-i-1] \quad (8\text{-}1102)$$

The variables QpQ and QpP are set equal to the QpY values of the coding units which include the coding blocks containing the sample q0,0 and p0,0, respectively.
The variable QpC is derived as follows:
If ChromaArrayType is equal to 1, the variable QpC is determined as specified in Table 8 15 based on the index qPi derived as follows:

$$qPi = ((QpQ+QpP+1) >> 1) + cQpPicOffset \quad (8\text{-}1103)$$

Otherwise (ChromaArrayType is greater than 1), the variable QpC is set equal to Min(qPi, 63).

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset. The value of the variable β' is determined as specified in Table 8 20 based on the quantization parameter Q derived as follows:

$$Q = Clip3(0,63,QpC+(slice\_beta\_offset\_div2 << 1)) \quad (8\text{-}1104)$$

where slice_beta_offset_div2 is the value of the syntax element slice_beta_offset_div2 for the slice that contains sample q0,0.
The variable β is derived as follows:

$$\beta = (\beta' * (1 << (BitDepthC-8))) \quad (8\text{-}1105)$$

The value of the variable tC' is determined as specified in Table 8 20 based on the chroma quantization parameter Q derived as follows:

$$Q = Clip3(0,65,QpC+2*(bS-1)+(slice\_tc\_offset\_div2 << 1)) \quad (8\text{-}1106)$$

where slice_tc_offset_div2 is the value of the syntax element slice_tc_offset_div2 for the slice that contains sample q0,0.
The variable tC is derived as follows:

$$tC = tC' * (1 << (BitDepthC-8)) \quad (8\text{-}1107)$$

When maxFilterLengthCbCr is equal to 1 and bS is not equal to 2, maxFilterLengthCbCr is set equal to 0.

When maxFilterLengthCbCr is equal to 3, the following ordered steps apply:
1. The variables dpq0, dpq1, dp, dq and d are derived as follows:

$$dp0 = Abs(p2,0 - 2*p1,0 + p0,0) \quad (8\text{-}1108)$$

$$dp1 = Abs(p2,1 - 2*p1,1 + p0,1) \quad (8\text{-}1109)$$

$$dq0 = Abs(q2,0 - 2*q1,0 + q0,0) \quad (8\text{-}1110)$$

$$dq1 = Abs(q2,1 - 2*q1,1 + q0,1) \quad (8\text{-}1111)$$

$$dpq0 = dp0 + dq0 \quad (8\text{-}1112)$$

$$dpq1 = dp1 + dq1 \quad (8\text{-}1113)$$

$$dp = dp0 + dp1 \quad (8\text{-}1114)$$

$$dq = dq0 + dq1 \quad (8\text{-}1115)$$

$$d = dpq0 + dpq1 \quad (8\text{-}1116)$$

2. The variables dSam0 and dSam1 are both set equal to 0.
3. When d is less than β, the following ordered steps apply:
   a. The variable dpq is set equal to 2*dpq0.
   b. The variable dSam0 is derived by invoking the decision process for a chroma sample as specified in clause 8.8.3.6.8 for the sample location (xCb+xBl, yCb+yBl) with sample values p0,0, p3,0, q0,0, and q3,0, the variables dpq, β and tC as inputs, and the output is assigned to the decision dSam0.
   c. The variable dpq is set equal to 2*dpq1.
   d. The variable dSam1 is modified as follows:
      If edgeType is equal to EDGE_VER, for the sample location (xCb+xBl, yCb+yBl+1), the decision process for a chroma sample as specified in clause 8.8.3.6.8 is invoked with sample values p0,1, p3,1, q0,1, and q3,1, the variables dpq, β and tC as inputs, and the output is assigned to the decision dSam1.
      Otherwise (edgeType is equal to EDGE_HOR), for the sample location (xCb+xBl+1, yCb+yBl), the decision process for a chroma sample as specified in clause 8.8.3.6.8 is invoked with sample values p0,1, p3,1, q0,1 and q3,1, the variables dpq, β and tC as inputs, and the output is assigned to the decision dSam1.
4. The variable maxFilterLengthCbCr is modified as follows:
   If dSam0 is equal to 1 and dSam1 is equal to 1, maxFilterLengthCbCr is set equal to 3.
   Otherwise, maxFilterLengthCbCr is set equal to 1.

8.8.3.6.4. Filtering Process for Chroma Block Edges

This process is only invoked when ChromaArrayType is not equal to 0.
Inputs to this process are:
a chroma picture sample array recPicture,
a chroma location (xCb, yCb) specifying the top-left sample of the current chroma coding block relative to the top-left chroma sample of the current picture,
a chroma location (xBl, yBl) specifying the top-left sample of the current chroma block relative to the top-left sample of the current chroma coding block,
a variable edgeType specifying whether a vertical (EDGE_VER) or a horizontal (EDGE_HOR) edge is filtered, a variable maxFilterLengthCbCr containing the maximum chroma filter length,
the variable tC.

Output of this process is the modified chroma picture sample array recPicture.

The maxK is derived as follows:
  If edgeType is equal to EDGE_VER, the following applies:

maxK=(SubHeightC==1)?3:1            (8-1117)

Otherwise (edgeType is equal to EDGE_HOR), the following applies:

maxK=(SubWidthC==1)?3:1             (8-1118)

The values pi and qi with i=0 . . . maxFilterLengthCbCr and k=0 . . . maxK are derived as follows:
  If edgeType is equal to EDGE_VER, the following applies:

$q_{i,k}$=recPicture[xCb+xBl+i][yCb+yBl+k]   (8-1119)

$p_{i,k}$=recPicture[xCb+xBl−i−1][yCb+yBl+k] (8-1120)

Otherwise (edgeType is equal to EDGE_HOR), the following applies:

$q_{i,k}$=recPicture[xCb+xBl+k][yCb+yBl+i]   (8-1121)

$p_{i,k}$=recPicture[xCb+xBl+k][yCb+yBl−i−1] (8-1122)

Depending on the value of edgeType, the following applies:
  If edgeType is equal to EDGE_VER, for each sample location (xCb+xBl, yCb+yBl+k), k=0 . . . maxK, the following ordered steps apply:
    1. The filtering process for a chroma sample as specified in clause 8.8.3.6.9 is invoked with the variable maxFilterLengthCbCr, the sample values pi,k, qi,k with i=0 . . . maxFilterLengthCbCr, the locations (xCb+xBl−i−1, yCb+yBl+k) and (xCb+xBl+i, yCb+yBl+k) with i=0 . . . maxFilterLengthCbCr−1, and the variable tC as inputs, and the filtered sample values pi' and qi' with i=0 . . . maxFilterLengthCbCr−1 as outputs.
    2. The filtered sample values pi' and qi' with i=0 . . . maxFilterLengthCbCr−1 replace the corresponding samples inside the sample array recPicture as follows:

recPicture[xCb+xBl+i][yCb+yBl+k]=qi'   (8-1123)

recPicture[xCb+xBl−i−1][yCb+yBl+k]=pi' (8-1124)

Otherwise (edgeType is equal to EDGE_HOR), for each sample location (xCb+xBl+k, yCb+yBl), k=0 . . . maxK, the following ordered steps apply:
    1. The filtering process for a chroma sample as specified in clause 8.8.3.6.9 is invoked with the variable maxFilterLengthCbCr, the sample values pi,k, qi,k with i=0 . . . maxFilterLengthCbCr, the locations (xCb+xBl+k, yCb+yBl−i−1) and (xCb+xBl+k, yCb+yBl+i), and the variable tC as inputs, and the filtered sample values pi' and qi' as outputs.
    2. The filtered sample values pi' and qi' replace the corresponding samples inside the sample array recPicture as follows:

recPicture[xCb+xBl+k][yCb+yBl+i]=qi'   (8-1125)

recPicture[xCb+xBl+k][yCb+yBl−i−1]=pi' (8-1126)

8.8.3.6.5. Decision Process for a Luma Sample

Inputs to this process are:
  the sample values p0, p3, q0 and q3,
  the variables dpq, sp, sq, spq, sidePisLargeBlk, sideQisLargeBlk, β and tC.

Output of this process is the variable dSam containing a decision.

The variables sp and sq are modified as follows:
  When sidePisLargeBlk is equal to 1, the following applies:

sp=(sp+Abs(p3−p0)+1)>>1            (8-1127)

When sideQisLargeBlk is equal to 1, the following applies:

sq=(sq+Abs(q3−q0)+1)>>1            (8-1128)

The variable sThr is derived as follows:
  If sidePisLargeBlk is equal to 1 or sideQisLargeBlk is equal to 1, the following applies:

sThr=3*β>>5                        (8-1129)

Otherwise, the following applies:

sThr=β>>3                          (8-1130)

The variable dSam is specified as follows:
  If all of the following conditions are true, dSam is set equal to 1:
    dpq is less than (β>>2),
    sp+sq is less than sThr,
    spq is less than (5*tC+1)>>1.
  Otherwise, dSam is set equal to 0.

8.8.3.6.6. Filtering Process for a Luma Sample Using Short Filters

Inputs to this process are:
  the sample values pi and qi with i=0 . . . 3,
  the locations of pi and qi, (xPi, yPi) and (xQi, yQi) with i=0 . . . 2,
  a variable dE,
  the variables dEp and dEq containing decisions to filter samples p1 and q1, respectively,
  a variable tC.

Outputs of this process are:
  the number of filtered samples nDp and nDq,
  the filtered sample values pi' and qj' with i=0 . . . nDp 1, j=0 . . . nDq 1.

Depending on the value of dE, the following applies:
  If the variable dE is equal to 2, nDp and nDq are both set equal to 3 and the following strong filtering applies:

p0'=Clip3(p0−3*tC,p0+3*tC,(p2+2*p1+2*p0+2*q0+q1+4)>>3)   (8-1131)

p1'=Clip3(p1−2*tC,p1+2*tC,(p2+p1+p0+q0+2)>>2)            (8-1132)

p2'=Clip3(p2−1*tC,p2+1*tC,(2*p3+3*p2+p1+p0+q0+4)>>3)     (8-1133)

q0'=Clip3(q0−3*tC,q0+3*tC,(p1+2*p0+2*q0+2*q1+q2+4)>>3)   (8-1134)

q1'=Clip3(q1−2*tC,q1+2*tC,(p0+q0+q1+q2+2)>>2)            (8-1135)

q2'=Clip3(q2−1*tC,q2+1*tC,(p0+q0+q1+3*q2+2*q3+4)>>3)     (8-1136)

Otherwise, nDp and nDq are set both equal to 0 and the following weak filtering applies:
  The following applies:

Δ=(9*(q0−p0)−3*(q1−p1)+8)>>4       (8-1137)

When Abs(Δ) is less than tC*10, the following ordered steps apply:

The filtered sample values p0' and q0' are specified as follows:

$$\Delta = \text{Clip3}(-tC, tC, \Delta) \quad (8\text{-}1138)$$

$$p0' = \text{Clip1Y}(p0 + \Delta) \quad (8\text{-}1139)$$

$$q0' = \text{Clip1Y}(q0) \quad (8\text{-}1140)$$

When dEp is equal to 1, the filtered sample value p1' is specified as follows:

$$\Delta p = \text{Clip3}(-(tC \gg 1), tC \gg 1, (((p2+p0+1) \gg 1) - p1+\Delta) \gg 1) \quad (8\text{-}1141)$$

$$p1' = \text{Clip1Y}(p1 + \Delta p) \quad (8\text{-}1142)$$

When dEq is equal to 1, the filtered sample value q1' is specified as follows:

$$\Delta q = \text{Clip3}(-(tC \gg 1), tC \gg 1, (((q2+q0+1) \gg 1) - q1) \gg 1) \quad (8\text{-}1143)$$

$$q1' = \text{Clip1Y}(q1 + \Delta q) \quad (8\text{-}1144)$$

nDp is set equal to dEp+1 and nDq is set equal to dEq+1.

When nDp is greater than 0 and one or more of the following conditions are true, nDp is set equal to 0:
  pcm_loop_filter_disabled_flag is equal to 1 and pcm_flag[xP0][yP0] is equal to 1.
  cu_transquant_bypass_flag of the coding unit that includes the coding block containing the sample p0 is equal to 1.

When nDq is greater than 0 and one or more of the following conditions are true, nDq is set equal to 0:
  pcm_loop_filter_disabled_flag is equal to 1 and pcm_flag[xQ0][yQ0] is equal to 1.
  cu_transquant_bypass_flag of the coding unit that includes the coding block containing the sample q0 is equal to 1.

8.8.3.6.7. Filtering Process for a Luma Sample Using Long Filters

Inputs to this process are:
  the variables maxFilterLengthP and maxFilterLengthQ,
  the sample values pi and qj with i=0 . . . maxFilterLengthP and j=0 . . . maxFilterLengthQ,
  the locations of pi and qj, (xPi, yPi) and (xQj, yQj) with i=0 . . . maxFilterLengthP−1 and j=0 . . . maxFilterLengthQ−1,
  a variable tC.

Outputs of this process are:
  the filtered sample values pi' and qj' with i=0 . . . maxFilterLengthP−1, j=0 . . . maxFilterLenghtQ−1.

The variable refMiddle is derived as follows:
  If maxFilterLengthP is equal to maxFilterLengthQ and maxFilterLengthP is equal to 5, the following applies:

$$\text{refMiddle} = (p4+p3+2*(p2+p1+p0+q0+q1+q2)+q3+q4+8) \gg 4 \quad (8\text{-}1145)$$

Otherwise, if maxFilterLengthP is equal to maxFilterLengthQ and maxFilterLengthP is not equal to 5, the following applies:

$$\text{refMiddle} = (p6+p5+p4+p3+p2+p1+2*(p0+q0)+q1+q2+q3+q4+q5+q6+8) \gg 4 \quad (8\text{-}1146)$$

Otherwise, if one of the following conditions are true, maxFilterLengthQ is equal to 7 and maxFilterLengthP is equal to 5, maxFilterLengthQ is equal to 5 and maxFilterLengthP is equal to 7, the following applies:

$$\text{refMiddle} = (p4+p3+2*(p2+p1+p0+q0+q1+q2)+q3+q4+8) \gg 4 \quad (8\text{-}1147)$$

Otherwise, if one of the following conditions are true, maxFilterLengthQ is equal to 5 and maxFilterLengthP is equal to 3, maxFilterLengthQ is equal to 3 and maxFilterLengthP is equal to 5, the following applies:

$$\text{refMiddle} = (p3+p2+p1+p0+q0+q1+q2+q3+4) \gg 3 \quad (8\text{-}1148)$$

Otherwise, if maxFilterLengthQ is equal to 7 and maxFilterLengthP is equal to 3, the following applies:

$$\text{refMiddle} = (2*(p2+p1+p0+q0)+p0+p1+q1+q2+q3+q4+q5+q6+8) \gg 4 \quad (8\text{-}1149)$$

Otherwise, the following applies:

$$\text{refMiddle} = (p6+p5+p4+p3+p2+p1+2*(q2+q1+q0+p0)+q0+q1+8) \gg 4 \quad (8\text{-}1150)$$

The variables refP and refQ are derived as follows:

$$\text{refP} = (p\text{maxFilterLengtP} + p\text{maxFilterLengthP}-1+1) \gg 1 \quad (8\text{-}1151)$$

$$\text{refQ} = (q\text{maxFilterLengtQ} + q\text{maxFilterLengthQ}-1+1) \gg 1 \quad (8\text{-}1152)$$

The variables fi and tCPDi are defined as follows:
  If maxFilterLengthP is equal to 7, the following applies:

$$f_{0..6} = \{59, 50, 41, 32, 23, 14, 5\} \quad (8\text{-}1153)$$

$$tCPD_{0..6} = \{6, 5, 4, 3, 2, 1, 1\} \quad (8\text{-}1154)$$

Otherwise, if maxFilterLengthP is equal to 5, the following applies:

$$f_{0..4} = \{58, 45, 32, 19, 6\} \quad (8\text{-}1155)$$

$$tCPD_{0..4} = \{6, 5, 4, 3, 2\} \quad (8\text{-}1156)$$

Otherwise, the following applies:

$$f_{0..2} = \{53, 32, 11\} \quad (8\text{-}1157)$$

$$tCPD_{0..2} = \{6, 4, 2\} \quad (8\text{-}1158)$$

The variables gj and tCQDj are defined as follows:
  If maxFilterLengthQ is equal to 7, the following applies:

$$g_{0..6} = \{59, 50, 41, 32, 23, 14, 5\} \quad (8\text{-}1159)$$

$$tCQD_{0..6} = \{6, 5, 4, 3, 2, 1, 1\} \quad (8\text{-}1160)$$

Otherwise, if maxFilterLengthQ is equal to 5, the following applies:

$$g_{0..4} = \{58, 45, 32, 19, 6\} \quad (8\text{-}1161)$$

$$tCQD_{0..4} = \{6, 5, 4, 3, 2\} \quad (8\text{-}1162)$$

Otherwise, the following applies:

$$g_{0..2} = \{53, 32, 11\} \quad (8\text{-}1163)$$

$$tCQD_{0..2} = \{6, 4, 2\} \quad (8\text{-}1164)$$

The filtered sample values pi' and qj' with i=0 . . . maxFilterLengthP−1 and j=0 . . . maxFilterLengthQ−1 are derived as follows:

$$pi' = \text{Clip3}(pi-(tC*tCPDi) \gg 1, pi+(tC*tCPDi) \gg 1, (\text{refMiddle}*fi + \text{refP}*(64-fi)+32) \gg 6) \quad (8\text{-}1165)$$

$$qj' = \text{Clip3}(qj-(tC*tCQDj) \gg 1, qj+(tC*tCQDj) \gg 1, (\text{refMiddle}*gj + \text{refQ}*(64-gj)+32) \gg 6) \quad (8\text{-}1166)$$

When one or more of the following conditions are true, the filtered sample value, p i' is substituted by the corresponding input sample value pi with i=0 . . . maxFilterLengthP−1:
  pcm_loop_filter_disabled_flag is equal to 1 and pcm_flag [xPi][yPi] is equal to 1.
  cu_transquant_bypass_flag of the coding unit that includes the coding block containing the sample pi is equal to 1.
When one or more of the following conditions are true, the filtered sample value, q i' is substituted by the corresponding input sample value q j with j=0 . . . maxFilterLengthQ−1:
  pcm_loop_filter_disabled_flag is equal to 1 and pcm_flag [xQi][yQi] is equal to 1.
  cu_transquant_bypass_flag of the coding unit that includes the coding block containing the sample qi is equal to 1.

8.8.3.6.8. Decision Process for a Chroma Sample

Inputs to this process are:
  the sample values p0, p3, q0 and q3,
  the variables dpq, β and tC.
Output of this process is the variable dSam containing a decision.
  The variable dSam is specified as follows:
If all of the following conditions are true, dSam is set equal to 1:
  dpq is less than (β>>2),
  Abs(p3−p0)+Abs(q0−q3) is less than (β>>3),
  Abs(p0−q0) is less than (5*tC+1)>>1.
  Otherwise, dSam is set equal to 0.

8.8.3.6.9. Filtering Process for a Chroma Sample

This process is only invoked when ChromaArrayType is not equal to 0.
Inputs to this process are:
  the variable maxFilterLength,
  the chroma sample values pi and qi with i=0 . . . maxFilterLengthCbCr,
  the chroma locations of pi and qi, (xPi, yPi) and (xQi, yQi) with i=0 . . . maxFilterLengthCbCr−1,
  a variable tC.
Outputs of this process are the filtered sample values pi' and qi' with i=0 . . . maxFilterLengthCbCr−1.
The filtered sample values pi' and qi' with i=0 . . . maxFilterLengthCbCr−1 are derived as follows:
  If maxFilterLengthCbCr is equal to 3, the following strong filtering applies:

$$p0'=\text{Clip3}(p0-tC,p0+tC,(p3+p2+p1+2*p0+q0+q1+q2+4)>>3) \quad (8\text{-}1167)$$

$$p1'=\text{Clip3}(p1-tC,p1+tC,(2*p3+p2+2*p1+p0+q0+q1+4)>>3) \quad (8\text{-}1168)$$

$$p2'=\text{Clip3}(p2-tC,p2+tC,(3*p3+2*p2+p1+p0+q0+4)>>3) \quad (8\text{-}1169)$$

$$q0'=\text{Clip3}(q0-tC,q0+tC,(p2+p1+p0+2*q0+q1+q2+q3+4)>>3) \quad (8\text{-}1170)$$

$$q1'=\text{Clip3}(q1-tC,q1+tC,(p1+p0+q0+2*q1+q2+2*q3+4)>>3) \quad (8\text{-}1171)$$

$$q2'=\text{Clip3}(q2-tC,q2+tC,(p0+q0+q1+2*q2+3*q3+4)>>3) \quad (8\text{-}1172)$$

Otherwise, the following weak filtering applies:

$$=\text{Clip3}(tC,tC,((((q0-p0)<<2)+p1-q1+4)>>3)) \quad (8\text{-}1173)$$

$$p0'=\text{Clip1C}(p0+\square) \quad (8\text{-}1174)$$

$$q0'=\text{Clip1C}(q0-\square) \quad (8\text{-}1175)$$

When one or more of the following conditions are true, the filtered sample value, pi' is substituted by the corresponding input sample value pi with i=0 . . . maxFilterLengthCbCr−1:
  pcm_loop_filter_disabled_flag is equal to 1 and pcm_flag [xPi*SubWidthC][yPi*SubHeightC] is equal to 1.
  cu_transquant_bypass_flag of the coding unit that includes the coding block containing the sample pi is equal to 1.
When one or more of the following conditions are true, the filtered sample value, qi' is substituted by the corresponding input sample value qi with i=0 . . . maxFilterLengthCbCr−1:
  pcm_loop_filter_disabled_flag is equal to 1 and pcm_flag [xQi*SubWidthC][yQi*SubHeightC] is equal to 1.
  cu_transquant_bypass_flag of the coding unit that includes the coding block containing the sample qi is equal to 1.

3. Drawbacks of Existing Implementations

In the current VVC/VTM deblocking design, for chroma, the decision and filtering operations can be much different from component to component, which may make parallel processing for chroma components difficult.

4. Example Techniques and Embodiments

It is proposed to harmonize deblocking for all chroma components to ensure that the same deblocking decision and operations can be applied to different chroma components. It can enable a uniform procedure for different chroma components for the benefit of high parallelism and throughput.

It is noted that the chroma components may represent the Cb/Cr colour components, or B/R colour components for the RGB format. In the following descriptions, we take 'Cb/Cr' for examples.

The detailed embodiments described below should be considered as examples to explain general concepts. These embodiments should not be interpreted narrowly way. Furthermore, these embodiments can be combined in any manner.

The methods described below may be also applicable to other decoder motion information derivation technologies in addition to the DMVR and BIO mentioned below.
  1. It is proposed to apply a same decision result for all chroma components.
    a. In one example, the decision result may represent the decision that deblocking filter shall be performed to chroma block boundaries.
    b. In one example, the decision result may represent the decision of boundary strength.
    c. In one example, information of only one colour component is utilized to derive the decision for both chroma components.
      i. In one example, the decision made for Cb component may be applied to Cr component.
      ii. In one example, the decision made for Cr component may be applied to Cb component.
    d. In one example, the chroma deblocking filter decision procedure considers both Cb and Cr components.

i. In one example, the decision is applied to both color components.

ii. Alternatively, a first decision is made for Cb and Cr respectively and the final decision applied to both Cb and Cr components is based on the first decisions.

e. In one example, when at least one of the adjacent Cb or Cr blocks has non-zero transform coefficients, the boundary strength for Cb and Cr blocks are set to 1.

i. Alternatively, when at least one of the adjacent Cb or Cr blocks has non-zero transform coefficients and none of the adjacent Cb and Cr blocks is intra coded, the boundary strength for Cb and Cr blocks are set to 1.

f. In one example, when at least one of the adjacent Cb blocks has non-zero transform coefficients and at least one of the adjacent Cr blocks has non-zero transform coefficients, the boundary strength for Cb and Cr blocks are set to 1.

i. Alternatively, furthermore, when both adjacent Cb blocks do not have non-zero transform coefficients, or both adjacent Cr blocks do not have non-zero transform coefficients, the boundary strength for Cb and Cr blocks are set to 0.

ii. Alternatively, when at least one of the adjacent Cb blocks has non-zero transform coefficients and at least one of the adjacent Cr blocks has non-zero transform coefficients and none of the adjacent Cb and Cr blocks is intra coded, the boundary strength for Cb and Cr blocks are set to 1.

g. In one example, when applying deblocking filter decision is true for one chroma component, the decision may be applied to all chroma components.

i. Alternatively, when applying deblocking filter decision is true for one colour component, the decision may be applied to all colour components.

h. In one example, when applying strong deblocking filter decision is true for one chroma component, the decision may be applied to all chroma components.

i. Alternatively, when applying strong deblocking filter decision is true for one colour component, the decision may be applied to all colour components.

2. It is proposed to apply a same filter for all chroma components.

a. In one example, information of only one colour component is utilized to derive the filter applied to all chroma components.

i. In one example, the filter applied may be derived from the signals of Cb components.

ii. In one example, the filter applied may be derived from the signals of Cr components.

b. In one example, the filter applied may be derived from the signals of both Cb and Cr components.

c. In one example, when the boundary strength for Cb blocks is not equal to 0 or the boundary strength for Cb blocks is not equal to 0, chroma deblocking may be performed on both Cb and Cr blocks.

d. In one example, when the boundary strength for Cb blocks is equal to 0 or the boundary strength for Cb blocks is equal to 0, chroma deblocking may be disallowed for both Cb and Cr blocks.

e. In one example, when StrongFilterCondition described in section 2.2.4 is true for one chroma component, the strong deblocking filter may be applied to all chroma components.

i. Alternatively, when StrongFilterCondition described in section 2.2.4 is false for one chroma component, the strong deblocking filter may be disallowed for all chroma components.

f. In one example, when it is decided for one chroma component to apply normal deblocking filter and no deblocking filter is applied for the other chroma component, normal deblocking filter may be applied to both chroma components.

i. Alternatively, deblocking filter may not be applied to both chroma components.

g. In one example, when it is decided for one chroma component to apply strong/long deblocking filter and no deblocking filter is applied for the other chroma component, normal deblocking filter may be applied to both chroma components.

i. Alternatively, deblocking filter may not be applied to both chroma components.

ii. Alternatively, strong/long deblocking filter may be applied to both chroma components.

h. In one example, when it is decided for one chroma component to apply strong/long deblocking filter and normal deblocking filter is applied for the other chroma component, strong/long deblocking filter may be applied to both chroma components.

i. Alternatively, normal deblocking filter may be applied to both chroma components.

3. It is proposed that deblocking parameters, i.e. $\beta$ and tC for all chroma components may be set to the same a. In one example, $\beta$ and tC for all chroma components may follow one chroma component.

b. In one example, $\beta$ and tC for all chroma components may depend on the average of pps_cb_qp_offset or pps_cr_qp_offset c. In one example, $\beta$ and tC for all chroma components may depend on pps_joint_cbcr_qp_offset.

d. In one example, $\beta$ and tC for all chroma components may depend on the average of (pps_cb_qp_offset+slice_cb_qp_offset) and (pps_cr_qp_offset+slice_cr_qp_offset).

e. In one example, $\beta$ and tC for all chroma components may depend on slice_joint_cbcr_qp_offset.

4. The above proposed methods may be applied under certain conditions.

a. In one example, the condition is the colour format is 4:2:0 and/or 4:2:2.

i. Alternatively, furthermore, for 4:4:4 colour format, how to apply deblocking filter to the two colour chroma components may follow the current design.

b. In one example, indication of usage of the above methods may be signalled in sequence/picture/slice/tile/brick/a video region-level, such as SPS/PPS/picture header/slice header.

5. Additional Embodiments

5.1 Embodiment #1

The Modified Boundary Strength

| Priority | Conditions | U | V |
|---|---|---|---|
| 5 | At least one of the adjacent blocks is intra | 2 | 2 |
| 4 | At least one of the adjacent chroma blocks, including Cb and Cr blocks, has non-zero transform coefficients | 1 | 1 |
| 3 | Absolute difference between the motion vectors that belong to the adjacent blocks is greater than or equal to one integer luma sample | N/A | N/A |
| 2 | Motion prediction in the adjacent blocks refers to vectors is different | N/A | N/A |
| 1 | Otherwise | 0 | 0 |

Chroma deblocking is performing when bS is equal to 2, or bS is equal to 1 when a large block boundary is detected.

5.2 Embodiment #2

If ChromaArrayType is equal to 1, the variable Qpc is determined as specified in Table 8-15 based on the index qPi derived as follows:

$$qPi=((Qp_Q+Qp_P+1)>>1)+((pps\_cb\_qp\_offset+pp-s\_cr\_qp\_offset+1)>>1)$$

or $qPi=((Qp_Q+Qp_P+pps\_cb\_qp\_offset+pp-s\_cr\_qp\_offset+1)>>1)$

Otherwise (ChromaArrayType is greater than 1), the variable Qpc is set equal to Min(qPi, 63).

The value of the variable β' is determined as specified in Table 8-20 based on the quantization parameter Q derived as follows:

$$Q=Clip3(0,63,Qp_C+(slice\_beta\_offset\_div2<<1))$$

where slice_beta_offset_div2 is the value of the syntax element slice_beta_offset_div2 for the slice that contains sample $q_{0,0}$.

The variable β is derived as follows:

$$\beta=\beta'*(1<<(BitDepth_C-8))$$

The decision of long/normal/none deblocking filter for Cb or Cr following VVC draft 5 and the uniform deblocking filter follows the table below

| Cb/Cr | Cr/Cb | Modified to |
|---|---|---|
| Long | Long | Long |
| Long | Normal | Long |
| Normal | Normal | Normal |
| Normal | None | Normal |
| Long | None | Normal |
| None | None | None |

5.3 Embodiment #3

If ChromaArrayType is equal to 1, the variable Qpc is determined as specified in Table 8-15 based on the index qPi derived as follows:

$$qPi=((Qp_Q+Qp_P+1)>>1)+((pps\_cb\_qp\_offset+pp-s\_cr\_qp\_offset+1)>>1)$$

or $qPi=((Qp_Q+Qp_P+pps\_cb\_qp\_offset+pp-s\_cr\_qp\_offset+1)>>1)$

Otherwise (ChromaArrayType is greater than 1), the variable Qpc is set equal to Min(qPi, 63).

The value of the variable β' is determined as specified in Table 8-20 based on the quantization parameter Q derived as follows:

$$Q=Clip3(0,63,Qp_C+(slice\_beta\_offset\_div2<<1))$$

where slice_beta_offset_div2 is the value of the syntax element slice_beta_offset_div2 for the slice that contains sample $q_{0,0}$.

The variable β is derived as follows:

$$\beta=\beta'*(1<<(BitDepth_C-8))$$

The decision of long/normal/none deblocking filter for Cb or Cr following VVC draft 5 and the uniform deblocking filter follows the table below

| Cb/Cr | Cr/Cb | Modified to |
|---|---|---|
| Long | Long | Long |
| Long | Normal | Normal |
| Normal | Normal | Normal |
| Normal | None | None |
| Long | None | Normal |
| None | None | None |

6. Example Implementations of the Disclosed Technology

Figure 5:
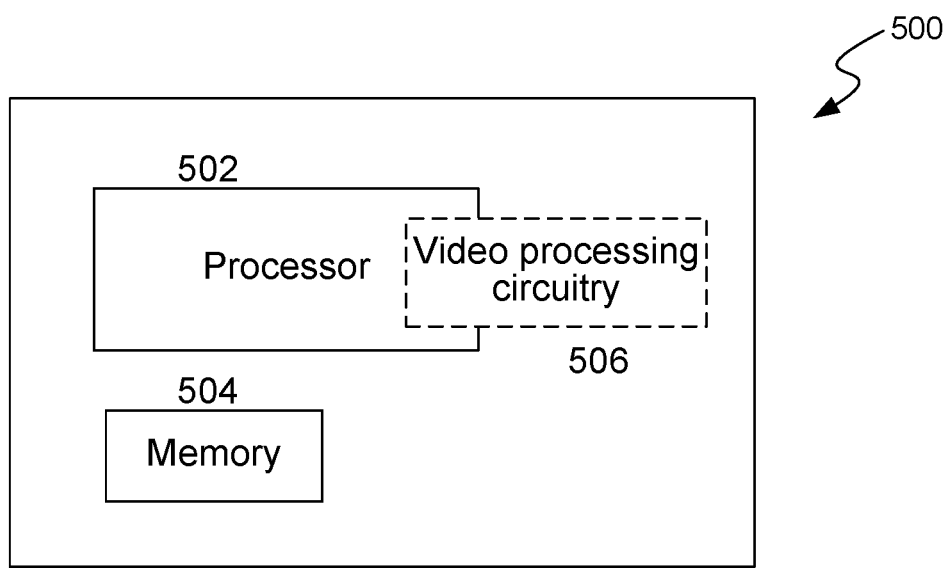
FIG. 5 is a block diagram of an example of a hardware platform for implementing a visual media decoding or a visual media encoding technique described in the present document.

FIG. 5 is a block diagram of a video processing apparatus 500. The apparatus 500 may be used to implement one or more of the methods described herein. The apparatus 500 may be embodied in a smartphone, tablet, computer, Internet of Things (IoT) receiver, and so on. The apparatus 500 may include one or more processors 502, one or more memories 504 and video processing hardware 506. The processor(s) 502 may be configured to implement one or more methods described in the present document. The memory (memories) 504 may be used for storing data and code used for implementing the methods and techniques described herein. The video processing hardware 506 may be used to implement, in hardware circuitry, some techniques described in the present document, and may be partly or completely be a part of the processors 502 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 6:
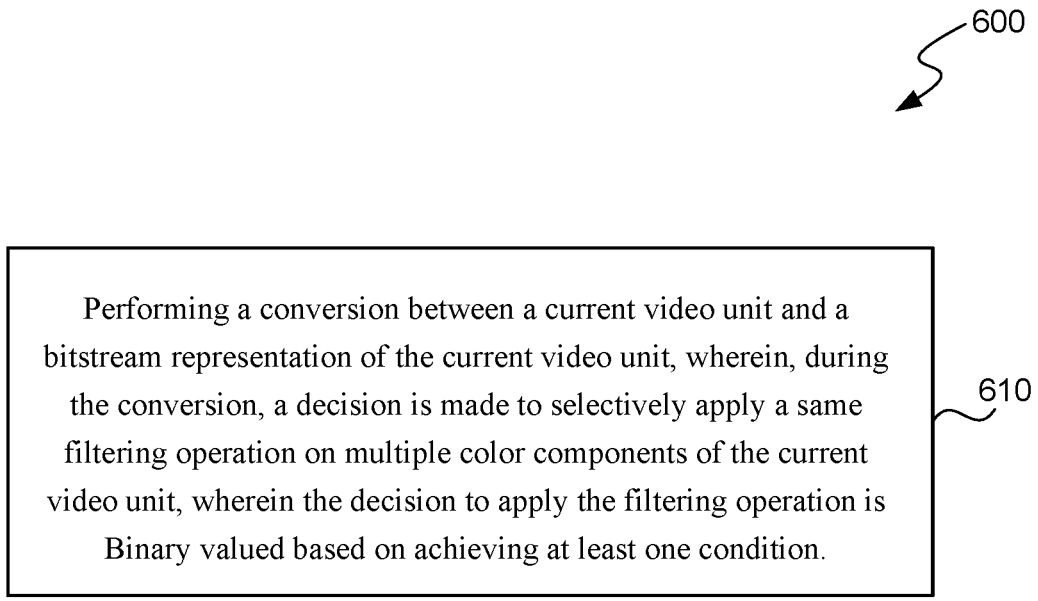
FIG. 6 shows a flowchart of an example method for video coding.

FIG. 6 is a flowchart for an example method 600 of video processing. The method 600 includes, at 610, performing a conversion between a current video unit and a bitstream representation of the current video unit, wherein, during the conversion, a decision is made to selectively apply a same filtering operation on multiple color components of the current video unit, wherein the decision to apply the filtering operation is Binary valued based on achieving at least one condition.

Some embodiments may be described using the following clause-based format.

1. A method of visual media processing, comprising: performing a conversion between a current video unit and a bitstream representation of the current video unit, wherein, during the conversion, a decision is made to selectively apply a same filtering operation on multiple color components of the current video unit, wherein the decision to apply the filtering operation is Binary valued based on achieving at least one condition.
2. The method of clause 1, wherein the same filtering operation is applied to boundaries of the current video unit.
3. The method of clause 1, wherein the at least one condition relates to a length of a boundary of the current video unit.
3. The method of clause 1, wherein the at least one condition is associated with only one of the multiple color components.
4. The method of clause 1, wherein the at least one condition is associated with all of the multiple color components.
5. The method of clause 1, wherein the decision to apply the same filtering operation on the multiple color components of the current video unit is based on individual outcomes of decisions to apply the same filtering operation to each of the multiple color components.
6. The method of clause 1, further comprising: upon detecting that at least one color component of a video unit adjacent to the current video unit has non-zero transform coefficients, setting a boundary strength value of the current video unit to a predefined number.
7. The method of clause 1, further comprising: upon detecting that at least one color component of a video unit adjacent to the current video unit has non-zero transform coefficients and the at least one color component is not intracoded, setting a boundary strength value of the current video unit to a predefined number.
8. The method of clause 1, further comprising: upon detecting that multiple color components of a video unit adjacent to the current video unit have non-zero transform coefficients and the multiple color components none of the multiple color components are intra-coded, setting a boundary strength value of the current video unit to a predefined number.
9. The method of clause 1, wherein when the decision to apply the filtering operation is true for one of the multiple color components of the current video unit, applying the filtering operation on each of the multiple color components of the current video unit.
10. The method of clause 1, wherein information related to one of the multiple color components of the current video unit is used to derive filtering operations related to the multiple color components of the current video unit.
11. The method of clause 1, wherein when a boundary strength value of the current video unit is not equal to a predefined number, enabling the filtering operation on the multiple color components of the current video unit.
12. The method of clause 1, wherein when a boundary strength value of the current video unit is not equal to a predefined number, disabling the filtering operation on each of the multiple color components of the current video unit.
13. The method of clause 1, wherein the at least one condition is related to a color format.
14. The method of clause 1, wherein the color format is 4:2:0 or 4:2:2.
15. The method of clause 1, wherein the multiple components of the current video unit are chroma components.
16. The method of clause 1, wherein the multiple components of the current video unit are in Cb, Cr format.
17. The method of clause 1, wherein the multiple components of the current video unit are in RGB format.
18. An apparatus in a video system comprising a processor and a non-transitory memory with instructions thereon, wherein the instructions upon execution by the processor, cause the processor to implement the method in any one of clauses 1 to 17.
19. A computer program product stored on a non-transitory computer readable media, the computer program product including program code for carrying out the method in any one of clauses 1 to 17.

Figure 7:
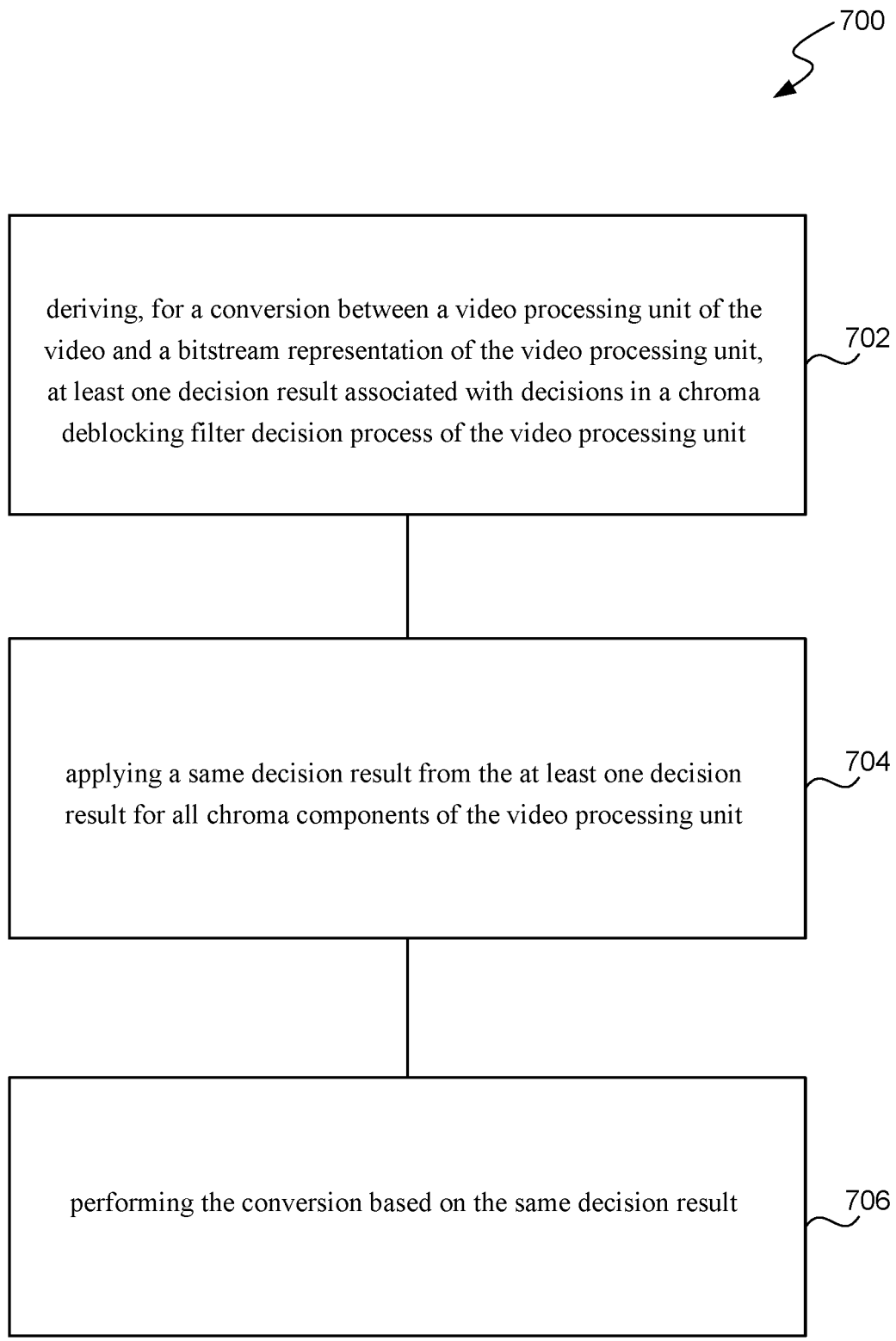
FIG. 7 shows a flowchart of an example method for video coding.

FIG. 7 is a flowchart for an example method 700 of video processing. The method 700 includes, at 702, deriving, for a conversion between a video processing unit of the video and a bitstream representation of the video processing unit, at least one decision result associated with decisions in a chroma deblocking filter decision process of the video processing unit; at 704, applying a same decision result from the at least one decision result for all chroma components of the video processing unit; and at 706, performing the conversion based on the same decision result.

In some examples, the chroma components of the video processing unit include a first chroma component and a second chroma component.

In some examples, the first chroma component is a Cb colour component and the second chroma component is a Cr colour component when the video processing unit is in a YCbCr format.

In some examples, the first chroma component is a G colour component and the second chroma component is a B colour component when the video processing unit is in a RGB format.

In some examples, the decision result indicates a decision that deblocking filter shall be performed to chroma block boundaries.

In some examples, the decision result indicates a decision of boundary strength.

In some examples, information of only one colour component is utilized to derive decision for both the first and second chroma components.

In some examples, the decision made for the first chroma component is applied to the second chroma components.

In some examples, the decision made for the second chroma component is applied to the first chroma components.

In some examples, information of both the first and second chroma components is utilized to derive decision for both the first and second chroma components.

In some examples, the decision is applied to both the first and second chroma components.

In some examples, the decision includes a first decision and a final decision, wherein the first decision is made for the first and second chroma components respectively, and the final decision applied to both the first and second chroma components is based on the first decision.

In some examples, when at least one of the adjacent first or second chroma component blocks has non-zero transform coefficients, the boundary strength for the first and second chroma component blocks are set to 1.

In some examples, when at least one of the adjacent first or second chroma component blocks has non-zero transform coefficients and none of the adjacent first and second chroma component blocks is intra coded, the boundary strength for the first and second chroma component blocks are set to 1.

In some examples, when at least one of the adjacent first or second chroma component blocks has non-zero transform coefficients and at least one of the adjacent second chroma component blocks has non-zero transform coefficients, the boundary strength for the first and second chroma component blocks are set to 1.

In some examples, when both adjacent first chroma component blocks do not have non-zero transform coefficients, or both adjacent second chroma component blocks do not have non-zero transform coefficients, the boundary strength for the first and second chroma component blocks are set to 0.

In some examples, when at least one of the adjacent first or second chroma component blocks has non-zero transform coefficients and at least one of the adjacent second chroma component blocks has non-zero transform coefficients and none of the adjacent first and second chroma component blocks is intra coded, the boundary strength for the first and second chroma component blocks are set to 1.

In some examples, the decision result indicates a decision whether applying deblocking filter for one chroma component, and when the decision indicates that applying deblocking filter for one chroma component, the decision is applied to all chroma components.

In some examples, the decision result indicates a decision whether applying deblocking filter for one colour component, and when the decision indicates that applying deblocking filter for one colour component, the decision is applied to all colour components.

In some examples, the decision result indicates a decision whether applying strong deblocking filter for one chroma component, and when the decision indicates that applying strong deblocking filter for one chroma component, the decision is applied to all chroma components.

In some examples, the decision result indicates a decision whether applying strong deblocking filter for one colour component, and when the decision indicates that applying strong deblocking filter for one colour component, the decision is applied to all colour components.

Figure 8:
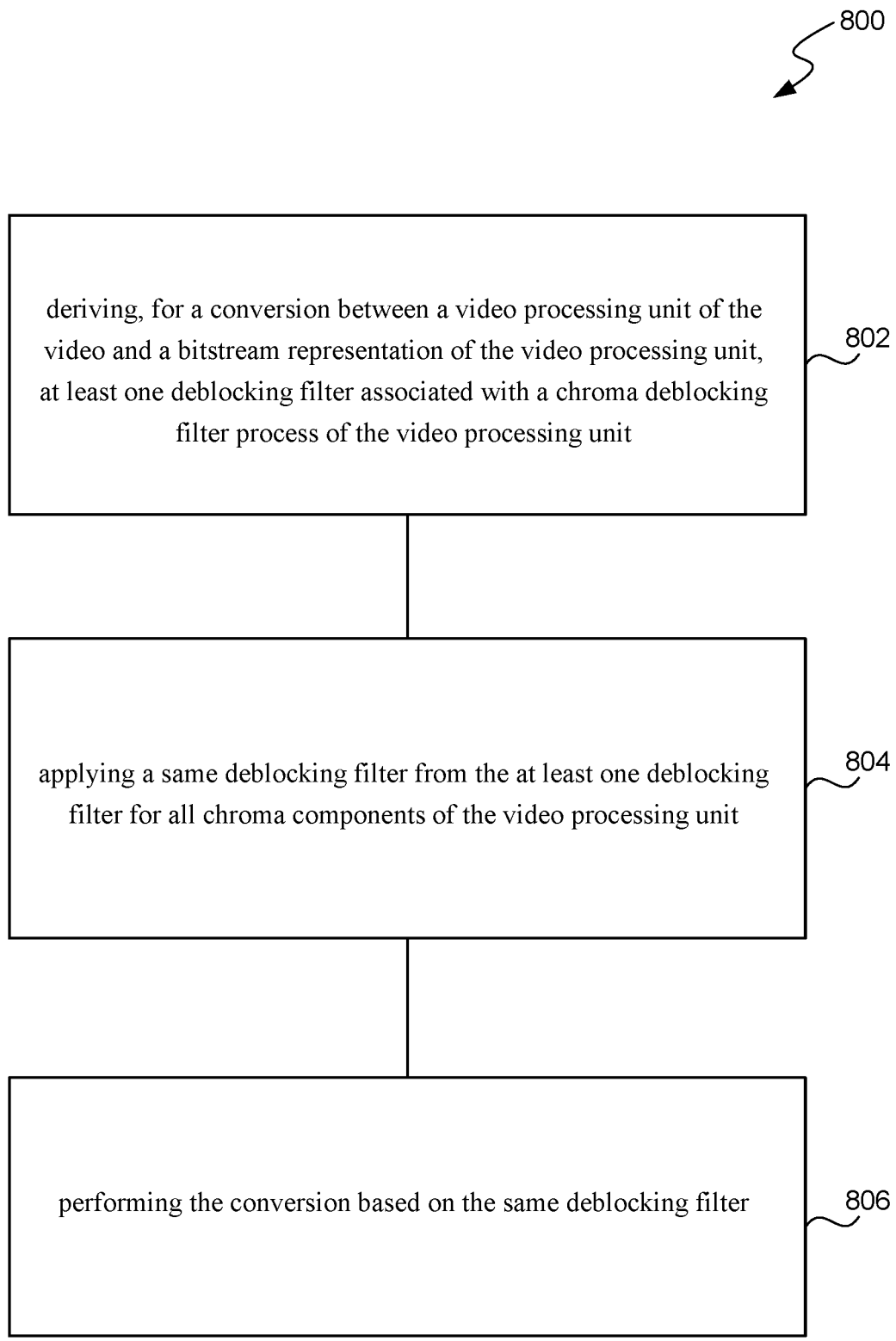
FIG. 8 shows a flowchart of an example method for video coding.

FIG. 8 is a flowchart for an example method 800 of video processing. The method 800 includes, at 802, deriving, for a conversion between a video processing unit of the video and a bitstream representation of the video processing unit, at least one deblocking filter associated with a chroma deblocking filter process of the video processing unit; at 804, applying a same deblocking filter from the at least one deblocking filter for all chroma components of the video processing unit; and at 806, performing the conversion based on the same deblocking filter.

In some examples, the chroma components of the video processing unit include a first chroma component and a second chroma component.

In some examples, the first chroma component is a Cb colour component and the second chroma component is a Cr colour component when the video processing unit is in a YCbCr format.

In some examples, the first chroma component is a G colour component and the second chroma component is a B colour component when the video processing unit is in a RGB format.

In some examples, information of only one colour component is utilized to derive the deblocking filter applied to all chroma components.

In some examples, the deblocking filter is derived from signals of the first chroma component.

In some examples, the deblocking filter is derived from signals of the second chroma component.

In some examples, the deblocking filter is derived from signals of both the first and second chroma components.

In some examples, when boundary strength for the first chroma component blocks is not equal to 0 or boundary strength for the second chroma component blocks is not equal to 0, the chroma deblocking filter process is performed on both the first and second chroma components.

In some examples, when boundary strength for the first chroma component blocks is equal to 0 or boundary strength for the second chroma component blocks is equal to 0, the chroma deblocking filter process is disallowed for both the first and second chroma components.

In some examples, when an indication of strong deblocking filter is true for one chroma component, the strong deblocking filter is applied to all chroma components, wherein the indication is StrongFilterCondition.

In some examples, when an indication of strong deblocking filter is false for one chroma component, the strong deblocking filter is disallowed for all chroma components, wherein the indication is StrongFilterCondition.

In some examples, when it is decided for one chroma component to apply normal deblocking filter and no deblocking filter is applied for the other chroma component, the normal deblocking filter is applied to both chroma components.

In some examples, when it is decided for one chroma component to apply normal deblocking filter and no deblocking filter is applied for the other chroma component, no deblocking filter is applied to both chroma components.

In some examples, when it is decided for one chroma component to apply strong or long deblocking filter and no deblocking filter is applied for the other chroma component, normal deblocking filter is applied to both chroma components.

In some examples, when it is decided for one chroma component to apply strong or long deblocking filter and no deblocking filter is applied for the other chroma component, no deblocking filter is applied to both chroma components.

In some examples, when it is decided for one chroma component to apply strong or long deblocking filter and no deblocking filter is applied for the other chroma component, the strong or long deblocking filter is applied to both chroma components.

In some examples, when it is decided for one chroma component to apply strong or long deblocking filter and normal deblocking filter is applied for the other chroma component, the strong or long deblocking filter is applied to both chroma components.

In some examples, when it is decided for one chroma component to apply strong or long deblocking filter and normal deblocking filter is applied for the other chroma component, the normal deblocking filter is applied to both chroma components.

Figure 9:
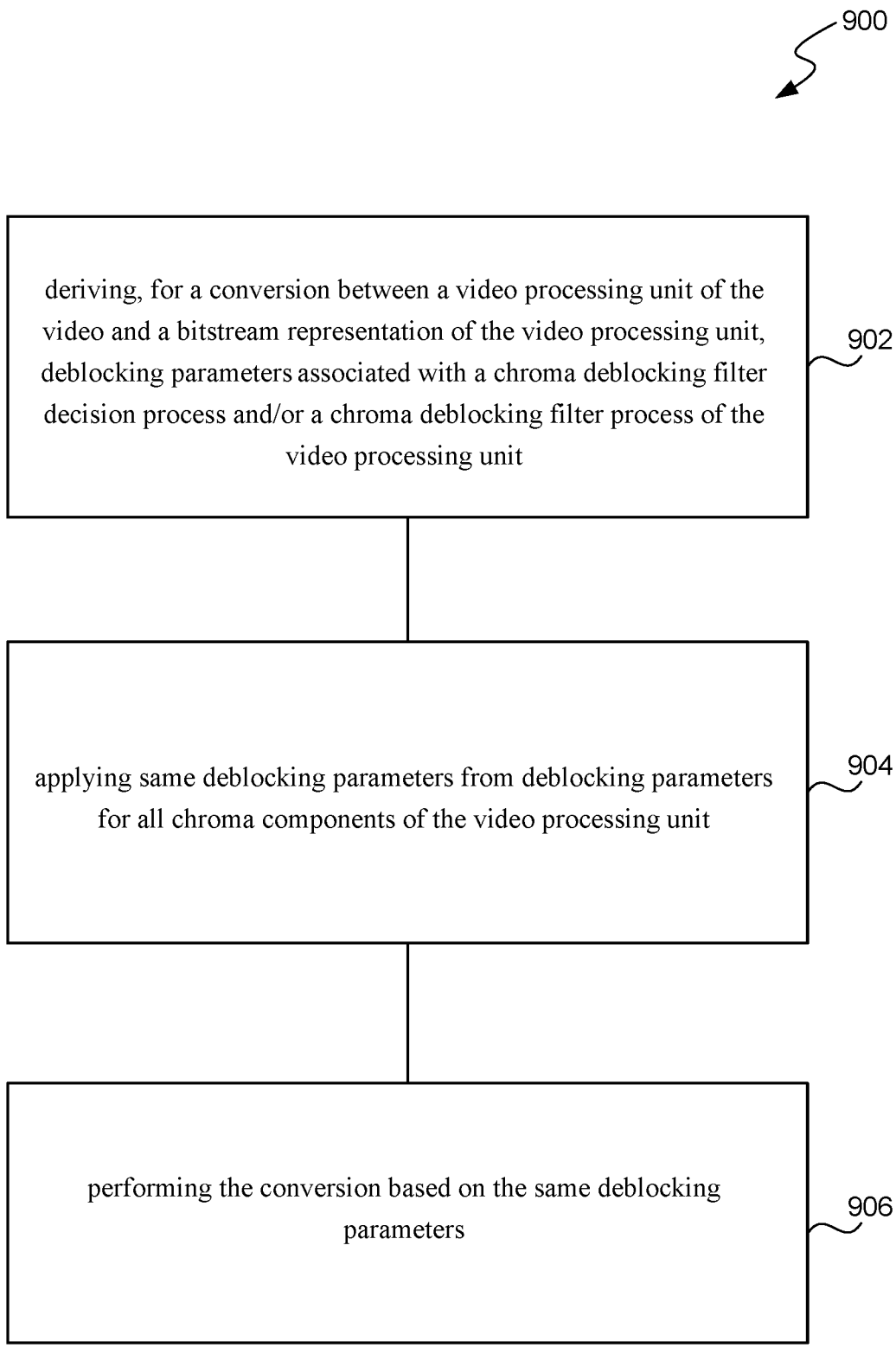
FIG. 9 shows a flowchart of an example method for video coding.

FIG. 9 is a flowchart for an example method 900 of video processing. The method 900 includes, at 902, deriving, for a conversion between a video processing unit of the video and a bitstream representation of the video processing unit, deblocking parameters associated with a chroma deblocking filter decision process and/or a chroma deblocking filter process of the video processing unit; at 904, applying same deblocking parameters from deblocking parameters for all chroma components of the video processing unit; and at 906, performing the conversion based on the same deblocking parameters.

In some examples, the chroma components of the video processing unit include a first chroma component and a second chroma component.

In some examples, the first chroma component is a Cb colour component and the second chroma component is a Cr colour component when the video processing unit is in a YCbCr format.

In some examples, the first chroma component is a G colour component and the second chroma component is a B colour component when the video processing unit is in a RGB format.

In some examples, the deblocking parameters include at least one of parameters $\beta$ and $t_C$ involved in the chroma deblocking filter decision process and the chroma deblocking filter process, wherein the parameters $\beta$ and $t_C$ are derived based on quantization parameters of blocks on both sides of the boundary.

In some examples, the parameters $\beta$ and $t_C$ for all chroma components follow one chroma component.

In some examples, the parameters $\beta$ and $t_C$ for all chroma components depend on the average of pps_cb_qp_offset or pps_cr_qp_offset, wherein the pps_cb_qp_offset and pps_cr_qp_offset are syntax elements which specify the offsets to the luma quantization parameter used for deriving chroma quantization parameter of Cb and Cr components, respectively.

In some examples, the parameters $\beta$ and $t_C$ for all chroma components depend on pps_joint_cbcr_qp_offset, wherein pps_joint_cbcr_qp_offset is a syntax element which specifies the offset to the luma quantization parameter used for deriving joint chroma quantization parameter.

In some examples, the parameters $\beta$ and $t_C$ for all chroma components depend on the average of (pps_cb_qp_offset+slice_cb_qp_offset) and (pps_cr_qp_offset+slice_cr_qp_offset);
wherein the pps_cb_qp_offset and pps_cr_qp_offset are syntax elements signaled in sequence parameter set, which specify the offsets to the luma quantization parameter used for deriving chroma quantization parameter of Cb and Cr components, respectively;
wherein the slice_cb_qp_offset and slice_cr_qp_offset are syntax elements signaled in slice header, which specifies a difference to be added to the value of pps_cb_qp_offset and pps_cr_qp_offset when determining the value of the chroma quantization parameter of Cb and Cr components, respectively.

In some examples, the parameters $\beta$ and $t_C$ for all chroma components depend on slice_joint_cbcr_qp_offset, wherein the slice_joint_cbcr_qp_offset is a syntax element signaled in slice header, which specifies a difference to be added to the value of pps_joint_cbcr_qp_offset value when determining the value of joint chroma quantization parameter, and the pps_joint_cbcr_qp_offset is a syntax element signaled in sequence parameter set, which specifies the offset to the luma quantization parameter used for deriving joint chroma quantization parameter.

In some examples, whether to apply the chroma deblocking filter decision process and/or the chroma deblocking filter process depends on certain condition.

In some examples, the condition is colour format of the video processing unit is 4:2:0 and/or 4:2:2.

In some examples, indications of usage of the chroma deblocking filter decision process and/or the chroma deblocking filter process are signaled in at least one of sequence, picture, slice, tile group, tile, brick and a video region-level.

In some examples, indications of usage of the chroma deblocking filter decision process and/or the chroma deblocking filter process are signaled in at least one of video parameter set (VPS), sequence parameter set (SPS) and picture parameter set (PPS), picture header, slice header, and tile group header.

In some examples, the video processing unit includes at least one of Coding Unit (CU), Prediction Unit (PU) and Transform Unit (TU).

In some examples, the conversion generates the video processing unit of video from the bitstream representation.

In some examples, the conversion generates the bitstream representation from the video processing unit of video.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video data, comprising:
deriving, for a conversion between a video processing unit of the video and a bitstream of the video processing unit, at least one deblocking filter associated with a chroma deblocking filter process of the video processing unit;
applying a same deblocking filter from the at least one deblocking filter for all chroma components of the video processing unit; and
performing the conversion based on the same deblocking filter.

2. The method of claim 1, wherein the chroma components of the video processing unit include a first chroma component and a second chroma component.

3. The method of claim 2, wherein the first chroma component is a Cb colour component and the second chroma component is a Cr colour component when the video processing unit is in a YCbCr format.

4. The method of claim 2, wherein the first chroma component is a G colour component and the second chroma component is a B colour component when the video processing unit is in a RGB format.

5. The method of claim 1, wherein information of only one colour component is utilized to derive the deblocking filter applied to all chroma components.

6. The method of claim 5, wherein the deblocking filter is derived from signals of the first chroma component, or the deblocking filter is derived from signals of the second chroma component.

7. The method of claim 5, wherein the deblocking filter is derived from signals of both the first and second chroma components.

8. The method of claim 1, wherein when boundary strength for the first chroma component blocks is not equal to 0 or boundary strength for the second chroma component blocks is not equal to 0, the chroma deblocking filter process is performed on or disallowed for both the first and second chroma components.

9. The method of claim 1, wherein when an indication of strong deblocking filter is true for one chroma component, the strong deblocking filter is applied to or disallowed for all chroma components, wherein the indication is StrongFilterCondition.

10. The method of claim 1, wherein when it is decided for one chroma component to apply normal deblocking filter and no deblocking filter is applied for the other chroma component, the normal deblocking filter or no deblocking filter is applied to both chroma components.

11. The method of claim 1, wherein when it is decided for one chroma component to apply strong or long deblocking filter and no deblocking filter is applied for the other chroma component, normal deblocking filter or no deblocking filter is applied to both chroma components.

12. The method of claim 1, wherein when it is decided for one chroma component to apply strong or long deblocking filter and normal deblocking filter or no deblocking filter is applied for the other chroma component, the strong or long deblocking filter is applied to both chroma components.

13. The method of claim 1, wherein when it is decided for one chroma component to apply strong or long deblocking filter and normal deblocking filter is applied for the other chroma component, the normal deblocking filter is applied to both chroma components.

14. The method of claim 1, wherein the deblocking filter is performed to chroma block boundaries.

15. The method of claim 1, further comprising:
applying same deblocking parameters from the deblocking parameters for all chroma components of the video processing unit,
wherein the performing the conversion based on the same deblocking filter comprises:
performing the conversion based on the same deblocking filter and the same deblocking parameters.

16. The method of claim 15, wherein the same deblocking parameters include at least one of parameters $\beta$ and $t_C$ involved in the chroma deblocking filter decision process and the chroma deblocking filter process, wherein the parameters $\beta$ and $t_C$ are derived based on quantization parameters of blocks on both sides of the boundary.

17. The method of claim 1, wherein the conversion encoding the video processing unit of video from the bitstream.

18. The method of claim 1, wherein the conversion decoding the bitstream from the video processing unit of video.

19. An apparatus for processing video data comprising a processor and a non-transitory memory with instructions thereon, wherein the instructions upon execution by the processor, cause the processor to:
derive, for a conversion between a video processing unit of the video and a bitstream of the video processing unit, at least one deblocking filter associated with a chroma deblocking filter process of the video processing unit;
apply a same deblocking filter from the at least one deblocking filter for all chroma components of the video processing unit; and
perform the conversion based on the same deblocking filter.

20. A non-transitory computer-readable recording medium storing a bitstream of a video which is generated by a method performed by a video processing apparatus, wherein the method comprises:
deriving at least one deblocking filter associated with a chroma deblocking filter process of the video processing unit;
applying a same deblocking filter from the at least one deblocking filter for all chroma components of the video processing unit; and
performing the conversion based on the same deblocking filter.

* * * * *